US009868675B2

(12) United States Patent
Wallenstein et al.

(10) Patent No.: US 9,868,675 B2
(45) Date of Patent: Jan. 16, 2018

(54) SYNERGISTIC BACTERIAL CONSORTIA FOR MOBILIZING SOIL PHOSPHORUS

(71) Applicant: Colorado State University Research Foundation, Fort Collins, CO (US)

(72) Inventors: Matthew D. Wallenstein, Fort Collins, CO (US); Colin W. Bell, Fort Collins, CO (US)

(73) Assignee: COLORADO STATE UNIVERSITY RESEARCH FOUNDATION, Fort Collins, CO (US)

(*) Notice: Subject to any disclaimer, the term of this patent is extended or adjusted under 35 U.S.C. 154(b) by 36 days.

(21) Appl. No.: 14/935,130

(22) Filed: Nov. 6, 2015

(65) Prior Publication Data

US 2016/0145163 A1 May 26, 2016

Related U.S. Application Data

(60) Provisional application No. 62/084,303, filed on Nov. 25, 2014, provisional application No. 62/171,643, filed on Jun. 5, 2015.

(51) Int. Cl.
*C05F 11/08* (2006.01)

(52) U.S. Cl.
CPC .................................... *C05F 11/08* (2013.01)

(58) Field of Classification Search
CPC ....................................................... C05F 11/08
See application file for complete search history.

(56) References Cited

U.S. PATENT DOCUMENTS

2005/0215619 A1 9/2005 Huang
2006/0046246 A1 3/2006 Zeng et al.
2007/0227212 A1* 10/2007 He .......................... C05B 17/00 71/31
2009/0221014 A1 9/2009 Reardon et al.
2009/0308121 A1* 12/2009 Reddy ..................... C05F 11/08 71/6
2014/0147425 A1 5/2014 Henn et al.
2014/0329677 A1 11/2014 Anisimova et al.

FOREIGN PATENT DOCUMENTS

WO WO 2011/154963 12/2011

OTHER PUBLICATIONS

Mechmech et al., Industrial Crops and Products 78:73-81, 2015.*
International Search Report International Application No. PCT/US2015/059565 dated Feb. 9, 2016, 4 pages.
Lu et al., "Microbial Metabolism and Community Structure in Response to Bioelectrochemically Enhanced Remediation of Petroleum Hydrocarbon-Contaminated Soil and Supporting Information for Publication", Environmental Science & Technology, Mar. 14, 2014, vol. 8, 18 pages, http://pubs.acs.org/doi/abs/10.1021/es4057906.
Singh et al., "Biodegradation of Chlorpyrifos by Enterobacter Strain B-14 and Its Use in Bioremedation of Contaminated Soils", Applied and Environmental Microbiology, Aug. 1, 2004, vol. 70, No. 8, pp. 4855-4863.

* cited by examiner

*Primary Examiner* — Delia Ramirez
(74) *Attorney, Agent, or Firm* — Dorsey & Whitney LLP

(57) ABSTRACT

The present disclosure relates to consortia of bacteria strains and composition comprising one or more bacterial strains disclosed herein. These consortia of isolated bacteria cultures and compositions comprising said cultures, having greater activity than would be observed for the individual bacteria cultures and compositions. A composition of the disclosure may advantageously be used for enhancing the availability of soil phosphorus and other macronutrients and/or micronutrients to plants, and thereby enhancing their growth and yield.

21 Claims, 17 Drawing Sheets

Table 4.1 Turf grass elemental analysis demonstrated higher plant nutrient uptake for several macro and micronutrients when inoculated with biostimulants (higher rates are indicated in bold). *T = Treatment; M = Moisture*

| T | M | P | Ca | Mg | Na | K | Al | Fe | Mn | Ti | Cu | Zn | Ni | Mo | Cd | Cr | Sr | B | Ba | Pb | Si | V |
|---|---|---|---|---|---|---|---|---|---|---|---|---|---|---|---|---|---|---|---|---|---|---|
| **Bentgrass** | | | | | | | | | | | | | | | | | | | | | | |
| 1 | 90.14 | 1.43 | 0.593 | 0.176 | **0.07** | 1.19 | 0.062 | 0.035 | 57.8 | 15.7 | **41.5** | 27 | **4.48** | 1.37 | **1.08** | **3.37** | 27.4 | 55.2 | 52 | 0.845 | 24.2 | 2.83 |
| 2 | 88.94 | 1.38 | 0.575 | 0.169 | 0.049 | 1.25 | 0.107 | 0.055 | 58.5 | 29.7 | 136 | 30.8 | 3.92 | 1.33 | 0.98 | 1.63 | 26.6 | 56.1 | 54.8 | 1.18 | 27.1 | 4.11 |
| 3 | 97.39 | 1.37 | 0.687 | 0.183 | 0.038 | 1.19 | 0.138 | 0.07 | 65.9 | 40.4 | 64.6 | 28.1 | 3.43 | 2.08 | 0.942 | 2.18 | 33.5 | 57.8 | 65.2 | 0.965 | 33.3 | 7.42 |
| **Bluegrass** | | | | | | | | | | | | | | | | | | | | | | |
| 1 | 81.88 | 1.74 | 0.694 | **0.231** | **0.045** | **1.57** | **0.196** | **0.117** | **45.5** | **55.5** | **28.4** | 33.7 | **5.78** | **0.89** | 1.38 | **2.3** | 30.9 | **53.2** | **70.5** | 1.236 | 29.5 | **8.63** |
| 2 | 95.27 | 2.2 | 0.528 | 0.16 | 0.038 | 1.04 | 0.03 | 0.022 | 26.4 | 8.01 | 26.7 | 43.3 | 4.07 | 0.69 | 0.988 | 1.26 | 30.1 | 50.5 | 84 | 0.801 | 33.8 | 4.27 |
| 3 | 86.68 | 1.82 | 0.508 | 0.178 | 0.028 | 1.32 | 0.056 | 0.034 | 23.6 | 17.1 | 70.5 | 22.9 | 4.33 | 0.7 | 1.29 | 2.17 | 27.3 | 48.1 | 60.5 | 0.581 | 28.4 | 6.45 |
| **Fescue** | | | | | | | | | | | | | | | | | | | | | | |
| 1 | 83.85 | 1.83 | 0.607 | **0.322** | 0.057 | 1.65 | 0.057 | 0.031 | 29.1 | 15.7 | **23.2** | 27.3 | 2.39 | 1.02 | 0.514 | 1.22 | 26.9 | 45.4 | 27.2 | 0.471 | 24.5 | 5.76 |
| 2 | 87.21 | 2.01 | 0.761 | 0.332 | 0.092 | 1.86 | 0.084 | 0.053 | 38.1 | 20.1 | 34.1 | 28 | 3.27 | 0.94 | 1.09 | 1.58 | 32.8 | 54.2 | 27.7 | 1.702 | 38.9 | 5.84 |
| 3 | 92.38 | 2.01 | 0.886 | 0.31 | 0.104 | 1.58 | 0.244 | 0.132 | 46.9 | 63 | 48.1 | 77.2 | 3.13 | 1.73 | 0.531 | 2.62 | 36.5 | 51.3 | 42.8 | 1.398 | 35.8 | 13.1 |
| **Rye** | | | | | | | | | | | | | | | | | | | | | | |
| 1 | 87.2 | **1.89** | **0.843** | **0.221** | **0.064** | 1.51 | 0.042 | 0.025 | 46.2 | 12.3 | 36.7 | 31.5 | 3.81 | 1.09 | 0.668 | 1.72 | **37.6** | 56.8 | 48.6 | 0.842 | 23.4 | 6.68 |
| 2 | 81.64 | **1.91** | 0.671 | 0.193 | **0.108** | 1.18 | 0.065 | 0.038 | 36.8 | 16.5 | 146 | 71.4 | 4.49 | 1.01 | 0.734 | 2.39 | 30.5 | 60.4 | 48.3 | 1.192 | 21.7 | 6.9 |
| 3 | 90.42 | 1.85 | 0.694 | 0.208 | 0.039 | 1.35 | 0.09 | 0.057 | 35.1 | 28.5 | 35.8 | 28.2 | 2.97 | 1.1 | 0.712 | 1.72 | 32.3 | 53.4 | 57.6 | 0.923 | 22.8 | 9.43 |

| | |
|---|---|
| Treatment 1 | P mobilizing microbial consortia of the present disclosure |
| Treatment 2 | Sterile media corresponding to treatment 1 (using 0.2μM) with no microbial activity |
| Treatment 3 | Common nutrient rich inorganic plant fertilizer used for a control (Hoagland's solution) |

Fig 17

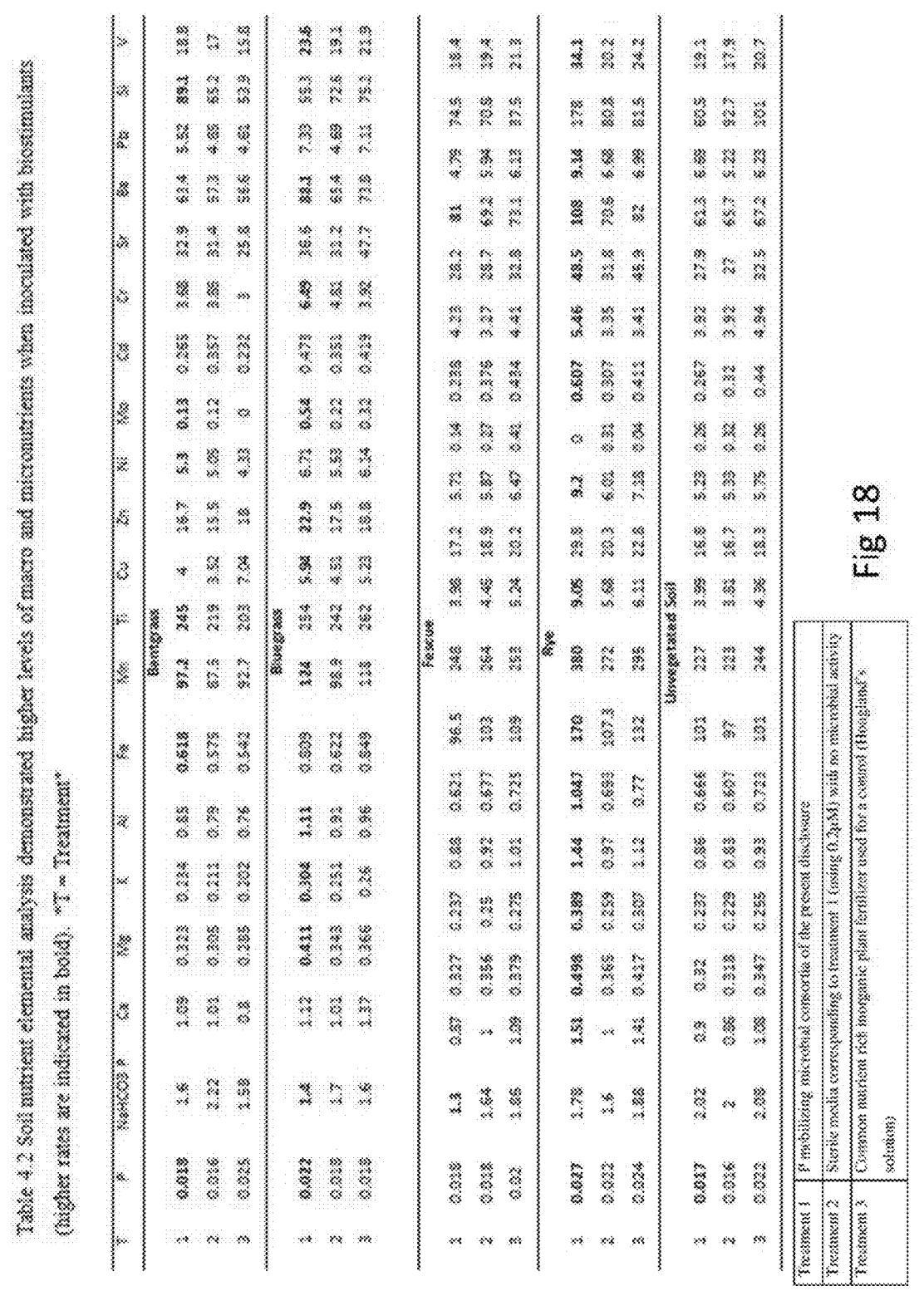

Table 4.2 Soil nutrient elemental analysis demonstrated higher levels of macro and micronutrients when inoculated with biostimulants (higher rates are indicated in bold). *T = Treatment*

| T | P | NaHCO3 P | Ca | Mg | K | Al | Fe | Mn | Ti | Cu | Zn | Ni | Mo | Cd | Cr | Sr | Ba | Pb | Si | V |
|---|---|---|---|---|---|---|---|---|---|---|---|---|---|---|---|---|---|---|---|---|
| | | | | | | | | Bentgrass | | | | | | | | | | | | |
| 1 | **0.018** | 1.6 | 1.09 | 0.223 | 0.234 | 0.85 | **0.618** | **97.2** | **245** | 4 | 16.7 | **5.3** | **0.13** | 0.263 | 3.68 | 32.9 | 63.4 | 5.52 | **89.1** | 18.8 |
| 2 | 0.016 | 2.22 | 1.01 | 0.305 | 0.211 | 0.79 | 0.579 | 87.5 | 219 | 3.52 | 15.5 | 5.05 | 0.12 | 0.357 | 3.86 | 31.4 | 57.3 | 4.65 | 65.2 | 17 |
| 3 | 0.025 | 1.58 | 0.8 | 0.285 | 0.202 | 0.76 | 0.542 | 92.7 | 203 | 7.04 | 18 | 4.33 | 0 | 0.232 | 3 | 25.8 | 56.6 | 4.61 | 53.9 | 15.8 |
| | | | | | | | | Bluegrass | | | | | | | | | | | | |
| 1 | **0.022** | **1.4** | 1.12 | **0.411** | **0.304** | **1.11** | 0.809 | **134** | 254 | **5.94** | **22.9** | 6.71 | **0.54** | 0.473 | **6.49** | 36.5 | **88.1** | 7.33 | 55.3 | **23.6** |
| 2 | 0.018 | 1.7 | 1.01 | 0.343 | 0.251 | 0.91 | 0.622 | 98.9 | 242 | 4.51 | 17.5 | 5.53 | 0.22 | 0.351 | 4.81 | 33.2 | 65.4 | 4.69 | 72.6 | 19.1 |
| 3 | 0.018 | 1.6 | 1.37 | 0.366 | 0.26 | 0.96 | 0.849 | 118 | 262 | 5.23 | 18.8 | 6.14 | 0.32 | 0.419 | 3.92 | 47.7 | 73.8 | 7.11 | 75.2 | 21.9 |
| | | | | | | | | Fescue | | | | | | | | | | | | |
| 1 | 0.018 | **1.3** | 0.87 | 0.327 | 0.237 | 0.88 | 0.621 | 96.5 | 348 | 3.98 | 17.2 | 5.72 | 0.34 | 0.238 | 4.23 | 28.2 | **81** | 4.79 | 74.5 | 18.4 |
| 2 | 0.018 | 1.64 | 1 | 0.356 | 0.25 | 0.92 | 0.677 | 103 | 364 | 4.46 | 18.9 | 5.87 | 0.27 | 0.376 | 3.27 | 28.7 | 69.2 | 5.94 | 70.8 | 19.4 |
| 3 | 0.02 | 1.86 | 1.09 | 0.379 | 0.275 | 1.01 | 0.725 | 109 | 353 | 5.24 | 20.2 | 6.47 | 0.41 | 0.434 | 4.41 | 32.8 | 73.1 | 6.13 | 87.5 | 21.3 |
| | | | | | | | | Rye | | | | | | | | | | | | |
| 1 | **0.027** | 1.78 | **1.51** | **0.498** | **0.389** | **1.44** | **1.047** | **170** | **380** | **9.05** | 29.8 | **9.2** | 0 | **0.607** | **5.46** | **48.5** | **108** | **9.14** | 178 | **34.1** |
| 2 | 0.022 | 1.6 | 1 | 0.365 | 0.259 | 0.97 | 0.693 | 107.3 | 272 | 5.68 | 20.3 | 6.01 | 0.31 | 0.307 | 3.35 | 31.8 | 70.6 | 6.68 | 80.8 | 20.2 |
| 3 | 0.024 | 1.88 | 1.41 | 0.417 | 0.307 | 1.12 | 0.77 | 132 | 295 | 6.11 | 22.6 | 7.18 | 0.04 | 0.411 | 3.41 | 45.9 | 82 | 6.99 | 81.5 | 24.2 |
| | | | | | | | | Unvegetated Soil | | | | | | | | | | | | |
| 1 | **0.017** | 2.02 | 0.9 | 0.32 | 0.237 | 0.86 | 0.666 | 101 | 227 | 3.99 | 16.8 | 5.23 | 0.26 | 0.267 | 3.92 | 27.9 | 61.3 | 6.69 | 60.5 | 19.1 |
| 2 | 0.016 | 2 | 0.86 | 0.318 | 0.229 | 0.83 | 0.607 | 97 | 223 | 3.81 | 16.7 | 5.33 | 0.32 | 0.32 | 3.92 | 27 | 65.7 | 5.22 | 92.7 | 17.9 |
| 3 | 0.022 | 2.08 | 1.08 | 0.347 | 0.255 | 0.93 | 0.723 | 101 | 244 | 4.36 | 18.3 | 5.75 | 0.26 | 0.44 | 4.94 | 32.5 | 67.2 | 6.23 | 101 | 20.7 |

| | |
|---|---|
| Treatment 1 | P mobilizing microbial consortia of the present disclosure |
| Treatment 2 | Sterile media corresponding to treatment 1 (using 0.2μM) with no microbial activity |
| Treatment 3 | Common nutrient rich inorganic plant fertilizer used for a control (Hoagland's solution) |

Fig 18

SEQUENCE LISTING

```
<160> NUMBER OF SEQ ID NOS: 4

<210> SEQ ID NO 1
<211> LENGTH: 1281
<212> TYPE: DNA
<213> ORGANISM: Comamonas testosteroni
<220> FEATURE:
<221> NAME/KEY: misc_feature
```

<222> LOCATION: (37)..(41)
<223> OTHER INFORMATION: n is a, c, g, t or u
<220> FEATURE:
<221> NAME/KEY: misc_feature
<222> LOCATION: (473)..(473)
<223> OTHER INFORMATION: n is a, c, g, t or u
<220> FEATURE:
<221> NAME/KEY: misc_feature
<222> LOCATION: (691)..(691)
<223> OTHER INFORMATION: n is a, c, g, t or u
<220> FEATURE:
<221> NAME/KEY: misc_feature
<222> LOCATION: (1247)..(1247)
<223> OTHER INFORMATION: n is a, c, g, t or u

<400> SEQUENCE: 1

```
catcggaacg tgcctagtag tgggggataa ctactcnnnn nagtagctaa taccgcatga     60

gatctacgga tgaaagcagg ggaccttcgg gccttgtgct actagagcgg ctgatggcag    120

attaggtagt tggtggggta aaggcttacc aagcctgcga tctgtagctg gtctgagagg    180

acgaccagcc acactgggac tgagacacgg cccagactcc tacgggaggc agcagtgggg    240

aattttggac aatgggcgaa agcctgatcc agcaatgccg cgtgcaggat gaaggccctc    300

gggttgtaaa ctgcttttgt acggaacgaa aagcctgggg ctaatatccc cgggtcatga    360

cggtaccgta agaataagca ccggctaact acgtgccagc agccgcggta atacgtaggg    420

tgcaagcgtt aatcggaatt actgggcgta aagcgtgcgc aggcggtttt gtnaagacag    480

tggtgaaatc cccgggctca acctggggaa ctgccattgt gactgcaagg ctagagtgcg    540

gcagaggggg atggaattcc gcgtgtagca gtgaaatgcg tagatatgcg gaggaacacc    600

gatggcgaag gcaatcccct gggcctgcac tgacgctcat gcacgaaagc gtggggagca    660

aacaggatta gataccctgg gtagtccacg nccctaaacg atgtcaactg gttgttgggt    720

cttaactgac tcagtaacga agctaacgcg tgaagttgac cgcctgggga gtacggccgc    780

aaggttgaaa ctcaaaggaa ttgacgggga cccgcacaag cggtggatga tgtggtttaa    840

ttcgatgcaa cgcgaaaaac cttacccacc tttgacatgg caggaactta ccagagatgg    900

tttggtgctc gaaagagaac ctgcacacag gtgctgcatg gctgtcgtca gctcgtgtcg    960

tgagatgttg ggttaagtcc cgcaacgagc gcaacccttg ccattagttg ctacattcag   1020

ttgagcactc taatgggact gccggtgaca aaccggagga aggtggggat gacgtcaagt   1080

cctcatggcc cttataggtg ggctacacac cgtcatacaa tggctggtac aaagggttgc   1140

caacccgcga gggggagcta atcccataaa gccagtcgta gtccggatcg cagtctgcaa   1200

ctcgactgcg tgaagtcgga atcgctagta atcgtggatc agaatgncac ggtgaatacg   1260

ttcccgggtc ttgtacacac c                                              1281
```

<210> SEQ ID NO 2
<211> LENGTH: 1286
<212> TYPE: DNA
<213> ORGANISM: Pseudomonas putida
<220> FEATURE:
<221> NAME/KEY: misc_feature
<222> LOCATION: (36)..(40)
<223> OTHER INFORMATION: n is a, c, g, t or u
<220> FEATURE:
<221> NAME/KEY: misc_feature
<222> LOCATION: (1247)..(1247)
<223> OTHER INFORMATION: n is a, c, g, t or u
<220> FEATURE:
<221> NAME/KEY: misc_feature
<222> LOCATION: (1249)..(1250)
<223> OTHER INFORMATION: n is a, c, g, t or u

<400> SEQUENCE: 2

```
tgcctaggaa tctgcctggt agtgggggac aacgtnnnnn aaggaacgct aataccgcat     60
acgtcctacg ggagaaagca ggggaccttc gggccttgcg ctatcagatg agcctaggtc    120
ggattagcta gttggtgggg taatggctca ccaaggcgac gatccgtaac tggtctgaga    180
ggatgatcag tcacactgga actgagacac ggtccagact cctacgggag gcagcagtgg    240
ggaatattgg acaatgggcg aaagcctgat ccagccatgc cgcgtgtgtg aagaaggtct    300
tcggattgta aagcacttta agttgggagg aagggcagta agttaatacc ttgctgtttt    360
gacgttaccg acagaataag caccggctaa ctctgtgcca gcagccgcgg taatacagag    420
ggtgcaagcg ttaatcggaa ttactgggcg taaagcgcgc gtaggtggtt cgttaagttg    480
gatgtgaaag ccccgggctc aacctgggaa ctgcatccaa aactggcgag ctagagtacg    540
gtagagggtg gtggaatttc ctgtgtagcg gtgaaatgcg tagatatagg aaggaacacc    600
agtggcgaag gcgaccacct ggactgatac tgacactgag gtgcgaaagc gtggggagca    660
aacaggatta gataccctgg tagtccacgc cgtaaacgat gtcaactagc cgttggaatc    720
cttgagattt tagtggcgca gctaacgcat taagtttgac cgcctgggga gtacggccgc    780
aaggttaaaa ctcaaatgaa ttgacggggg cccgcacaag cggtggagca tgtggtttaa    840
ttcgaagcaa cgcgaagaaa ccttaccagg ccttgacatg cagagaactt tccagagatg    900
gattggtgcc ttcgggaact ctgacacagg tgctgcatgg ctgtcgtcag ctcgtgtcgt    960
gagatgttgg gttaagtccc gtaacgagcg caacccttgt ccttagttac cagcacgtta   1020
tggtgggcac tctaaggaga ctgccggtga caaaccggag gaaggtgggg atgacgtcaa   1080
gtcatcatgg cccttacggc ctgggctaca cacgtgctac aatggtcggt acagagggtt   1140
gccaagccgc gaggtggagc taatctcaca aaaccgatcg tagtccggat cgcagtctgc   1200
aactcgactg cgtgaagtcg gaatcgctag taatcgcgaa tcagaangnn gcggtgaata   1260
cgttcccggg ccttgtacac accgcc                                        1286
```

<210> SEQ ID NO 3
<211> LENGTH: 1289
<212> TYPE: DNA
<213> ORGANISM: Citrobacter freundii
<220> FEATURE:
<221> NAME/KEY: misc_feature
<222> LOCATION: (36)..(38)
<223> OTHER INFORMATION: n is a, c, g, t or u
<220> FEATURE:
<221> NAME/KEY: misc_feature
<222> LOCATION: (40)..(40)
<223> OTHER INFORMATION: n is a, c, g, t or u
<220> FEATURE:
<221> NAME/KEY: misc_feature
<222> LOCATION: (340)..(341)
<223> OTHER INFORMATION: n is a, c, g, t or u
<220> FEATURE:
<221> NAME/KEY: misc_feature
<222> LOCATION: (893)..(893)
<223> OTHER INFORMATION: n is a, c, g, t or u
<220> FEATURE:
<221> NAME/KEY: misc_feature
<222> LOCATION: (896)..(896)
<223> OTHER INFORMATION: n is a, c, g, t or u
<220> FEATURE:
<221> NAME/KEY: misc_feature
<222> LOCATION: (908)..(912)
<223> OTHER INFORMATION: n is a, c, g, t or u
<220> FEATURE:
<221> NAME/KEY: misc_feature
<222> LOCATION: (927)..(927)
<223> OTHER INFORMATION: n is a, c, g, t or u
<220> FEATURE:
<221> NAME/KEY: misc_feature
<222> LOCATION: (1253)..(1255)
<223> OTHER INFORMATION: n is a, c, g, t or u
<220> FEATURE:
<221> NAME/KEY: misc_feature
<222> LOCATION: (1257)..(1257)
<223> OTHER INFORMATION: n is a, c, g, t or u

<400> SEQUENCE: 3
agtaatgtct gggaaactgc ccgatggagg gggatnnntn ctggaaacgg tagctaatac 60
cgcataacgt cgcaagacca aagaggggga ccttcgggcc tcttgccatc ggatgtgccc 120
agatgggatt agctagtagg tggggtaacg gctcacctag gcgacgatcc ctagctggtc 180
tgagaggatg accagccaca ctggaactga gacacggtcc agactcctac gggaggcagc 240
agtggggaat attgcacaat gggcgcaagc ctgatgcagc catgccgcgt gtatgaagaa 300
ggccttcggg ttgtaaagta ctttcagcga ggaggaaggn nttgtggtta ataaccgcag 360
tgattgacgt tactcgcaga agaagcaccg gctaactccg tgccagcagc cgcggtaata 420
cggagggtgc aagcgttaat cggaattact gggcgtaaag cgcacgcagg cggtctgtca 480
agtcggatgt gaaatccccg ggctcaacct gggaactgca tccgaaactg gcaggctaga 540
gtcttgtaga ggggggtaga attccaggtg tagcggtgaa atgcgtagag atctggagga 600
ataccggtgg cgaaggcggc ccccctggac aaagactgac gctcaggtgc gaaagcgtgg 660
ggagcaaaca ggattagata ccctggtagt ccacgccgta aacgatgtcg acttggaggt 720
tgtgcccttg aggcgtggct tccggagcta acgcgttaag tcgaccgcct ggggagtacg 780
gccgcaaggt taaaactcaa atgaattgac gggggcccgc acaagcggtg gagcatgtg 840 gtttaattcg atgcaacgcg aagaacctta cctactcttg acatccagag aanttngcag 900
agatgctnnn nntgccttcg ggaactnctg agacaggtgc tgcatggctg tcgtcagctc 960
gtgttgtgaa atgttgggtt aagtcccgca acgagcgcaa cccttatcct ttgttgccag 1020
cggttcggcc gggaactcaa aggagactgc cagtgataaa ctggaggaag gtggggatga 1080
cgtcaagtca tcatggccct tacgagtagg gctacacacg tgctacaatg gcatatacaa 1140
agagaagcga cctcgcgaga gcaagcggac ctcataaagt atgtcgtagt ccggattgga 1200
gtctgcaact cgactccatg aagtcggaat cgctagtaat cgtggatcag aannncncgg 1260
tgaatacgtt cccgggcctt gtacacacc 1289

<210> SEQ ID NO 4
<211> LENGTH: 1296
<212> TYPE: DNA
<213> ORGANISM: Enterobacter cloacae
<220> FEATURE:
<221> NAME/KEY: misc_feature
<222> LOCATION: (3)..(3)
<223> OTHER INFORMATION: n is a, c, g, t or u
<220> FEATURE:
<221> NAME/KEY: misc_feature
<222> LOCATION: (9)..(9)
<223> OTHER INFORMATION: n is a, c, g, t or u
<220> FEATURE:
<221> NAME/KEY: misc_feature
<222> LOCATION: (11)..(11)
<223> OTHER INFORMATION: n is a, c, g, t or u
<220> FEATURE:
<221> NAME/KEY: misc_feature
<222> LOCATION: (15)..(15)
<223> OTHER INFORMATION: n is a, c, g, t or u
<220> FEATURE:
<221> NAME/KEY: misc_feature
<222> LOCATION: (19)..(19)

<223> OTHER INFORMATION: n is a, c, g, t or u
<220> FEATURE:
<221> NAME/KEY: misc_feature
<222> LOCATION: (27)..(27)
<223> OTHER INFORMATION: n is a, c, g, t or u
<220> FEATURE:
<221> NAME/KEY: misc_feature
<222> LOCATION: (30)..(30)
<223> OTHER INFORMATION: n is a, c, g, t or u
<220> FEATURE:
<221> NAME/KEY: misc_feature
<222> LOCATION: (37)..(40)
<223> OTHER INFORMATION: n is a, c, g, t or u
<220> FEATURE:
<221> NAME/KEY: misc_feature
<222> LOCATION: (42)..(43)
<223> OTHER INFORMATION: n is a, c, g, t or u
<220> FEATURE:
<221> NAME/KEY: misc_feature
<222> LOCATION: (53)..(53)
<223> OTHER INFORMATION: n is a, c, g, t or u
<220> FEATURE:
<221> NAME/KEY: misc_feature
<222> LOCATION: (55)..(55)
<223> OTHER INFORMATION: n is a, c, g, t or u
<220> FEATURE:
<221> NAME/KEY: misc_feature
<222> LOCATION: (58)..(59)
<223> OTHER INFORMATION: n is a, c, g, t or u
<220> FEATURE:
<221> NAME/KEY: misc_feature
<222> LOCATION: (65)..(65)
<223> OTHER INFORMATION: n is a, c, g, t or u
<220> FEATURE:
<221> NAME/KEY: misc_feature
<222> LOCATION: (68)..(69)
<223> OTHER INFORMATION: n is a, c, g, t or u
<220> FEATURE:
<221> NAME/KEY: misc_feature
<222> LOCATION: (79)..(79)
<223> OTHER INFORMATION: n is a, c, g, t or u
<220> FEATURE:
<221> NAME/KEY: misc_feature
<222> LOCATION: (82)..(82)
<223> OTHER INFORMATION: n is a, c, g, t or u
<220> FEATURE:
<221> NAME/KEY: misc_feature
<222> LOCATION: (86)..(86)
<223> OTHER INFORMATION: n is a, c, g, t or u
<220> FEATURE:
<221> NAME/KEY: misc_feature
<222> LOCATION: (97)..(99)
<223> OTHER INFORMATION: n is a, c, g, t or u
<220> FEATURE:
<221> NAME/KEY: misc_feature
<222> LOCATION: (102)..(102)
<223> OTHER INFORMATION: n is a, c, g, t or u
<220> FEATURE:
<221> NAME/KEY: misc_feature
<222> LOCATION: (105)..(108)
<223> OTHER INFORMATION: n is a, c, g, t or u
<220> FEATURE:
<221> NAME/KEY: misc_feature
<222> LOCATION: (113)..(113)
<223> OTHER INFORMATION: n is a, c, g, t or u
<220> FEATURE:
<221> NAME/KEY: misc_feature
<222> LOCATION: (116)..(116)
<223> OTHER INFORMATION: n is a, c, g, t or u
<220> FEATURE:
<221> NAME/KEY: misc_feature
<222> LOCATION: (120)..(122)
<223> OTHER INFORMATION: n is a, c, g, t or u
<220> FEATURE:
<221> NAME/KEY: misc_feature
<222> LOCATION: (126)..(127)
<223> OTHER INFORMATION: n is a, c, g, t or u
<220> FEATURE:
<221> NAME/KEY: misc_feature
<222> LOCATION: (129)..(129)
<223> OTHER INFORMATION: n is a, c, g, t or u
<220> FEATURE:
<221> NAME/KEY: misc_feature
<222> LOCATION: (141)..(143)
<223> OTHER INFORMATION: n is a, c, g, t or u
<220> FEATURE:
<221> NAME/KEY: misc_feature
<222> LOCATION: (145)..(145)
<223> OTHER INFORMATION: n is a, c, g, t or u
<220> FEATURE:
<221> NAME/KEY: misc_feature
<222> LOCATION: (147)..(147)
<223> OTHER INFORMATION: n is a, c, g, t or u
<220> FEATURE:
<221> NAME/KEY: misc_feature
<222> LOCATION: (150)..(153)
<223> OTHER INFORMATION: n is a, c, g, t or u
<220> FEATURE:
<221> NAME/KEY: misc_feature
<222> LOCATION: (165)..(165)
<223> OTHER INFORMATION: n is a, c, g, t or u
<220> FEATURE:
<221> NAME/KEY: misc_feature
<222> LOCATION: (169)..(169)
<223> OTHER INFORMATION: n is a, c, g, t or u
<220> FEATURE:
<221> NAME/KEY: misc_feature
<222> LOCATION: (172)..(172)
<223> OTHER INFORMATION: n is a, c, g, t or u
<220> FEATURE:
<221> NAME/KEY: misc_feature
<222> LOCATION: (175)..(176)
<223> OTHER INFORMATION: n is a, c, g, t or u
<220> FEATURE:
<221> NAME/KEY: misc_feature
<222> LOCATION: (178)..(179)
<223> OTHER INFORMATION: n is a, c, g, t or u
<220> FEATURE:
<221> NAME/KEY: misc_feature
<222> LOCATION: (182)..(182)
<223> OTHER INFORMATION: n is a, c, g, t or u
<220> FEATURE:
<221> NAME/KEY: misc_feature
<222> LOCATION: (184)..(189)
<223> OTHER INFORMATION: n is a, c, g, t or u
<220> FEATURE:
<221> NAME/KEY: misc_feature
<222> LOCATION: (203)..(204)
<223> OTHER INFORMATION: n is a, c, g, t or u
<220> FEATURE:
<221> NAME/KEY: misc_feature
<222> LOCATION: (212)..(212)
<223> OTHER INFORMATION: n is a, c, g, t or u
<220> FEATURE:
<221> NAME/KEY: misc_feature
<222> LOCATION: (215)..(215)
<223> OTHER INFORMATION: n is a, c, g, t or u
<220> FEATURE:
<221> NAME/KEY: misc_feature
<222> LOCATION: (227)..(228)
<223> OTHER INFORMATION: n is a, c, g, t or u
<220> FEATURE:
<221> NAME/KEY: misc_feature
<222> LOCATION: (235)..(235)
<223> OTHER INFORMATION: n is a, c, g, t or u
<220> FEATURE:
<221> NAME/KEY: misc_feature
<222> LOCATION: (246)..(246)
<223> OTHER INFORMATION: n is a, c, g, t or u
<220> FEATURE:
<221> NAME/KEY: misc_feature
<222> LOCATION: (249)..(249)
<223> OTHER INFORMATION: n is a, c, g, t or u
<220> FEATURE:
<221> NAME/KEY: misc_feature
<222> LOCATION: (251)..(251)
<223> OTHER INFORMATION: n is a, c, g, t or u
<220> FEATURE:

```
<221> NAME/KEY: misc_feature
<222> LOCATION: (256)..(256)
<223> OTHER INFORMATION: n is a, c, g, t or u
<220> FEATURE:
<221> NAME/KEY: misc_feature
<222> LOCATION: (263)..(263)
<223> OTHER INFORMATION: n is a, c, g, t or u
<220> FEATURE:
<221> NAME/KEY: misc_feature
<222> LOCATION: (274)..(275)
<223> OTHER INFORMATION: n is a, c, g, t or u
<220> FEATURE:
<221> NAME/KEY: misc_feature
<222> LOCATION: (277)..(277)
<223> OTHER INFORMATION: n is a, c, g, t or u
<220> FEATURE:
<221> NAME/KEY: misc_feature
<222> LOCATION: (286)..(286)
<223> OTHER INFORMATION: n is a, c, g, t or u
<220> FEATURE:
<221> NAME/KEY: misc_feature
<222> LOCATION: (288)..(288)
<223> OTHER INFORMATION: n is a, c, g, t or u
<220> FEATURE:
<221> NAME/KEY: misc_feature
<222> LOCATION: (296)..(296)
<223> OTHER INFORMATION: n is a, c, g, t or u
<220> FEATURE:
<221> NAME/KEY: misc_feature
<222> LOCATION: (298)..(299)
<223> OTHER INFORMATION: n is a, c, g, t or u
<220> FEATURE:
<221> NAME/KEY: misc_feature
<222> LOCATION: (301)..(303)
<223> OTHER INFORMATION: n is a, c, g, t or u
<220> FEATURE:
<221> NAME/KEY: misc_feature
<222> LOCATION: (308)..(308)
<223> OTHER INFORMATION: n is a, c, g, t or u
<220> FEATURE:
<221> NAME/KEY: misc_feature
<222> LOCATION: (318)..(318)
<223> OTHER INFORMATION: n is a, c, g, t or u
<220> FEATURE:
<221> NAME/KEY: misc_feature
<222> LOCATION: (320)..(320)
<223> OTHER INFORMATION: n is a, c, g, t or u
<220> FEATURE:
<221> NAME/KEY: misc_feature
<222> LOCATION: (324)..(324)
<223> OTHER INFORMATION: n is a, c, g, t or u
<220> FEATURE:
<221> NAME/KEY: misc_feature
<222> LOCATION: (327)..(327)
<223> OTHER INFORMATION: n is a, c, g, t or u
<220> FEATURE:
<221> NAME/KEY: misc_feature
<222> LOCATION: (330)..(330)
<223> OTHER INFORMATION: n is a, c, g, t or u
<220> FEATURE:
<221> NAME/KEY: misc_feature
<222> LOCATION: (333)..(333)
<223> OTHER INFORMATION: n is a, c, g, t or u
<220> FEATURE:
<221> NAME/KEY: misc_feature
<222> LOCATION: (370)..(370)
<223> OTHER INFORMATION: n is a, c, g, t or u
<220> FEATURE:
<221> NAME/KEY: misc_feature
<222> LOCATION: (386)..(386)
<223> OTHER INFORMATION: n is a, c, g, t or u
<220> FEATURE:
<221> NAME/KEY: misc_feature
<222> LOCATION: (433)..(433)
<223> OTHER INFORMATION: n is a, c, g, t or u
<220> FEATURE:
<221> NAME/KEY: misc_feature
<222> LOCATION: (472)..(472)
<223> OTHER INFORMATION: n is a, c, g, t or u
```

<220> FEATURE:
<221> NAME/KEY: misc_feature
<222> LOCATION: (496)..(497)
<223> OTHER INFORMATION: n is a, c, g, t or u
<220> FEATURE:
<221> NAME/KEY: misc_feature
<222> LOCATION: (505)..(505)
<223> OTHER INFORMATION: n is a, c, g, t or u
<220> FEATURE:
<221> NAME/KEY: misc_feature
<222> LOCATION: (514)..(514)
<223> OTHER INFORMATION: n is a, c, g, t or u
<220> FEATURE:
<221> NAME/KEY: misc_feature
<222> LOCATION: (842)..(843)
<223> OTHER INFORMATION: n is a, c, g, t or u
<220> FEATURE:
<221> NAME/KEY: misc_feature
<222> LOCATION: (851)..(853)
<223> OTHER INFORMATION: n is a, c, g, t or u
<220> FEATURE:
<221> NAME/KEY: misc_feature
<222> LOCATION: (855)..(855)
<223> OTHER INFORMATION: n is a, c, g, t or u
<220> FEATURE:
<221> NAME/KEY: misc_feature
<222> LOCATION: (970)..(970)
<223> OTHER INFORMATION: n is a, c, g, t or u
<220> FEATURE:
<221> NAME/KEY: misc_feature
<222> LOCATION: (1237)..(1237)
<223> OTHER INFORMATION: n is a, c, g, t or u
<220> FEATURE:
<221> NAME/KEY: misc_feature
<222> LOCATION: (1239)..(1239)
<223> OTHER INFORMATION: n is a, c, g, t or u
<220> FEATURE:
<221> NAME/KEY: misc_feature
<222> LOCATION: (1243)..(1243)
<223> OTHER INFORMATION: n is a, c, g, t or u
<220> FEATURE:
<221> NAME/KEY: misc_feature
<222> LOCATION: (1280)..(1280)
<223> OTHER INFORMATION: n is a, c, g, t or u
<220> FEATURE:
<221> NAME/KEY: misc_feature
<222> LOCATION: (1293)..(1294)
<223> OTHER INFORMATION: n is a, c, g, t or u

<400> SEQUENCE: 4
ctnataccnc ntaangtcnc aagaccnaan agggggnnnn tnnggcctct tgncntcnna 60
tgtgnccnna tgggattanc tngtangtgg ggtaacnnnt cnccnnnncg acnatncctn 120
nntggnntna gaggatgacc nnncncnctn nnnctgagac acggnccana cnccnncnng 180
angnnnnnnt ggggaatatt gcnncaatgg gngcnagcct gatgcannca tgccncgtgt 240
atgaanaang ncttcnggtt gtnaagtact ttcnncnggg aggaangngt tgaggntnnt 300
nnnctcanca attgacgntn cccncanaan aancaccggc taactccgtg ccagcagccg 360
cggtaatacn gagggtgcaa gcgttnatcg gaattactgg gcgtaaagcg cacgcaggcg 420
gtctgtcaag tcngatgtga aatccccggg ctcaacctgg gaactgcatt cnaaactggc 480
aggctagagt cttgtnnagg ggggnagaat tccnggtgta gcggtgaaat gcgtagagat 540
ctggaggaat accggtggcg aaggcggccc cctggacaaa gactgacgct caggtgcgaa 600
agcgtgggga gcaaacagga ttagataccc tggtagtcca cgccgtaaac gatgtcgact 660
tggaggttgt gcccttgagg cgtggcttcc ggagctaacg cgttaagtcg accgcctggg 720
gagtacggcc gcaaggttaa aactcaaatg aattgacggg ggcccgcaca agcggtggag 780
catgtggttt aattcgatgc aacgcgaaga accttaccta ctcttgacat ccagagaact 840

-continued

```
tnncagagat nnntnggtgc cttcgggaac tctgagacag gtgctgcatg gctgtcgtca    900

gctcgtgttg tgaaatgttg ggttaagtcc cgcaacgagc gcaaccctta tcctttgttg    960

ccagcggttn ggccgggaac tcaaaggaga ctgccagtga taaactggag gaaggtgggg   1020

atgacgtcaa gtcatcatgg cccttacgag tagggctaca cacgtgctac aatggcgcat   1080

acaaagagaa gcgacctcgc gagagcaagc ggacctcata aagtgcgtcg tagtccggat   1140

tggagtctgc aactcgactc catgaagtcg gaatcgctag taatcgtaga tcagaatgct   1200

acggtgaata cgttcccggg ccttgtacac accgccngnc acnccatggg agtgggttgc   1260

aaaagaagta ggtagcttan ccttcgggag ggnnct                             1296
```

SYNERGISTIC BACTERIAL CONSORTIA FOR MOBILIZING SOIL PHOSPHORUS

CROSS REFERENCE TO RELATED APPLICATIONS

This application claims benefit of priority pursuant to 35 U.S.C. §119(e) of U.S. provisional patent application Nos. 62/084,303, filed on Nov. 25, 2014, and 62/171,643, filed on Jun. 5, 2015, which are incorporated herein by reference in their entirety.

SEQUENCE LISTING

A sequence listing submitted in computer readable format is hereby incorporated by reference. The computer readable file is named P253038us03_SynergisticBacteriaConsortia.TXT, was created on Sep. 8, 2015, and contains 16 kilobytes.

FIELD

The present disclosure relates to combinations of isolated bacterial cultures and compositions comprising said cultures, the combinations having greater activity than would be observed for the individual bacteria cultures. A composition of the present disclosure may advantageously be used for enhancing the availability of soil phosphorus and other macronutrients and/or micronutrients to plants, and thereby enhancing their growth and yield.

BACKGROUND

In the United States and most regions around the world, many farms suffer from low phosphorus (P) use efficiency, meaning that P inputs (fertilizer or manure) are greater than the P harvested in crops. Even when seemingly adequate P fertilizer is applied to soils, 70-90% can quickly become unavailable for plant uptake. This is largely because P readily sorbs to weathered mineral surfaces within the soil profile. Over time, this creates large pools of residual soil P that is unavailable for plant uptake. In response, farmers often apply P fertilizer in excess of plant requirements, which contributes to P runoff into groundwater and eutrophication of aquatic ecosystems.

Environmental awareness, resource constraints, and general public opinion are increasing the demand for efficient green technologies and products as options to traditional P fertilizer. Such green technologies and products are those that promote sustainability and have minimal impact on the environment. One area that is being exploited to develop green technology and products is the use of microorganisms and their specialized properties. While most soil P is unavailable to plants, some microorganisms have the ability to solubilize inorganic P and other micronutrients and mineralize organic P into soluble orthophosphate that is available for plant uptake. Collectively, these two processes mobilize soil phosphorus, increasing its availability to plants.

Other isolates of bacteria and fungi have also been reported to mobilize phosphorus. While there is great potential to improve microbial P mobilization, progress in commercializing microbial compositions has been largely limited. In some cases, commercial bacterial inoculants cannot significantly enhance P availability or plant growth even at high use concentrations, due to instability under certain conditions such as high temperature and high pH, and by the identification of single strains through traditional culturing techniques for use in the inoculants. Use of combinations of at least two bacteria isolates can improve activity, broaden potential applications, reduce use concentrations and costs, and reduce the need for chemical fertilizer inputs. Combinations of different bacteria isolates further can provide enhanced performance in a broader range of soils and climates due to functional redundancy. There are many other microbial inoculants on the market that claim to stimulate plant health. These products contain an undefined mixture of microbes that are grown on organic waste products, and are essentially a compost tea with no defined mechanistic functionality. While they make broad claims, these products are not very effective and have only penetrated a niche market of enthusiasts.

Accordingly, there is a need to develop microorganism-based technologies and products for P mobilization that are stable under various conditions, have an appreciable shelf life, combine two or more strains, and increase plant growth and health while reducing chemical inputs and environmental impact.

SUMMARY

Microbial isolates and consortia (mixtures of two or more distinct bacterial strains) can be used to improve microbial P mobilization, thus increasing soil phosphorus availability to plants, increasing their phosphorus uptake and growth. Applications include but are not limited to agricultural crops and turfgrass.

The present disclosure is directed to compositions containing and methods of using bacterial isolates and communities. In particular, the present disclosure is directed to a composition containing one or more microorganisms from the bacterial consortia as disclosed herein, particularly in Table 1 or mixtures thereof. In a preferred embodiment, the composition will include two or more strains from those listed in Table 1.

The microorganisms can be characterized by an identifying 16S ribosomal gene sequence corresponding to, and at and least 97% identical to SEQ ID NOs 1-4 and/or by comparison to bacteria with NRRL Accession Nos: NRRL B-67136, NRRL B-67137, NRRL B-67138, and NRRL B-67139.

In certain embodiments, the compositions will include additional components such as additives, auxiliaries and excipients in addition to the bacterial consortia. Such additional components may support growth of bacteria, induce production of specific metabolites by bacteria, enhance the stability of the composition, add color, add nutritive value, and/or provide other attributes to the compositions of the present disclosure. Suitable additives include a carbon source, a nitrogen source, chitin, chitosan, glucosamine, amino acids, minerals, vitamins, salts, preservatives and other additives known in the art to support growth, induce specific metabolite production, or stabilize the composition.

The compositions disclosed herein may be in aqueous or dry form. The compositions may be applied as a liquid (which may include live and/or dormant cultures, or extracts), dried mixtures, seed coatings, or other forms of application. The composition may be provided in a diluted or concentrated form. In one embodiment, the composition is concentrated. In another embodiment, the composition is diluted.

Methods of the present disclosure include using the disclosed composition to enrich soil and/or plants. The compositions can be applied to soil, seed, and seedling, or mature plants. The composition may be applied to the soil in liquid or dry form. The composition may be applied to the soil surface or mixed into the soil using methods known in the art, such as injection, tilling, and/or plowing. In another aspect, the composition may be used to enrich plants. The composition may be applied to soil or a water or fertilizer source, including hydroponic and aeroponic systems, which is then delivered to the soil and/or plant in liquid or dry form. In another aspect, the composition may be used to enrich seeds prior to planting. In various embodiments, the plant or seed may be grown in various environments, including fields and containers. In many embodiments, the plant or seed may be growing in natural soil, synthetic soil, or a combination thereof. In some embodiments, the soil may comprise coco fibers, rockwool, and/or other suitable media well known in the art. In some embodiments, seeds may be soaked in an aqueous solution containing the disclosed composition and/or the seeds may be coated with the composition. The treatment of soil, seed, and seedlings can also include repeated applications of the above compositions.

Methods of the present disclosure include using a microorganism composition as a chemical replacement or supplement to avoid or reduce the application of phosphorus containing fertilizers.

The application of the disclosed compositions allows for the elimination or significant reduction in the amount of fertilizer, fungicide and/or insecticide used in agricultural applications. In some embodiments, the use of the bacterial formulations results in a decrease in the amount of greenhouse gas emissions.

BRIEF DESCRIPTION OF THE DRAWINGS

FIGS. 11A, 11B, 110, 11D, and 11E are graphs showing plant tissue nutrient uptake for Kentucky Blue Grass using applicants' P mobilizing microbial biostimulant (Elevate P) and traditional inorganic fertilizers. The data shows that seeds inoculated with the P mobilizing microbial biostimulant composition of the disclosure (Elevate P) demonstrated increased soil Calcium (Ca, FIG. 11A), Magnesium (Mg, FIG. 11B), Sodium (Na, FIG. 11C), Potassium (K, FIG. 11D, and Iron (Fe, FIG. 11E) uptake compared to traditional inorganic fertilizers (Inorganic Fertilizer).

FIG. 17 is a table, Table 4.1, showing turf grass elemental analysis. The presented data demonstrate higher plant nutrient uptake for several macro and micronutrients when inoculated with biostimulants (higher rates are indicated in bold). *T=Treatment; M=Moisture*; Treatment 1 is P mobilizing microbial consortia of the present disclosure; Treatment 2 is Sterile media corresponding to treatment 1 (using 0.2 μM) with no microbial activity; Treatment 3 is Common nutrient rich inorganic plant fertilizer used for a control (Hoagland's solution).

FIG. 18 is a table, Table 4.2, showing soil nutrient elemental analysis that demonstrate higher levels of macro and micronutrients when inoculated with biostimulants (higher rates are indicated in bold). *T=Treatment*; Treatment 1 is P mobilizing microbial consortia of the present disclosure; Treatment 2 is Sterile media corresponding to treatment 1 (using 0.2 μM) with no microbial activity; Treatment 3 is Common nutrient rich inorganic plant fertilizer used for a control (Hoagland's solution).

BRIEF DESCRIPTION OF THE TABLES

Figure 1:
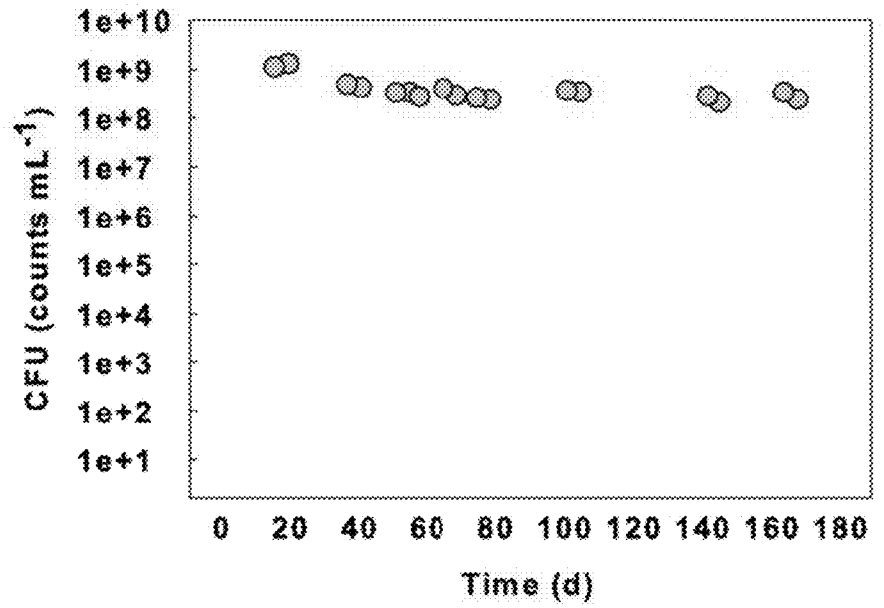
FIG. 1. Scatter plot shows stable bacterial growth, measured as colony forming units (cfu/ml) in liquid alfalfa media as a function of time.

Table 1. Phosphorus Mobilizing Bacterial Nomenclature (97% similarity)

Table 2.1 Example of defined media using Ferric ($FePO_4$) and aluminum ($AlPO_4$) substrates Table 2.2 Example of nutrient stoichiometry limits in Ferric ($FePO_4$) and aluminum ($AlPO_4$) media Table 3.1 Full factorial design to test interactive effects between the four target species for improved orthophosphate ($PO_4$) mobilization. Values below represent relative proportions (μL) to achieve a final volume of 50 μL to add to 950 μL in each well of the 96-deep well plates. Each culture was at $10^9$ CFU counts at time of the mixing.

Table 3.2 Bacterial community structure, colony forming units (CFU's) and relative abundances for our soil $PO_4$ mobilizing bacterial consortia Table 4.3 Treatment plot legend

DETAILED DESCRIPTION

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification are approximations that may vary depending upon the desired properties sought to be obtained by the present embodiments. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the features disclosed herein are presented below. Not all features of a physical implementation are necessarily described or shown in this application for the sake of clarity. It is to be understood that in the development of a physical embodiment incorporating the embodiments of the present disclosure, numerous implementation-specific decisions can be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill the art and having benefit of this disclosure.

Throughout this disclosure, various aspects of the presently disclosed compositions and methods can be presented in a range format. It should be understood that the description in range format is merely for convenience and brevity and should not be construed as an inflexible limitation on the scope of the present disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

While compositions and methods are described herein in terms of "comprising" various components or steps, the compositions and methods can also "consist essentially of" or "consist of" the various components and steps.

I. Phosphorus Mobilizing Consortia

Generally available commercial bacterial inoculants do not significantly enhance P availability or plant growth. This ineffectiveness is due, in part, to the inoculants' instability under various conditions such as high temperature and high pH. In contrast, described herein are combinations of different bacteria isolates that provide enhanced performance in a broad range of soils (e.g. natural and synthetic, as well as hydroponic and aeroponic systems), conditions, and climates. The enhanced performance of the disclosed combinations is due, in part, to functional redundancy of the selected bacterial isolates and to the selection process that identifies and modifies the bacteria resulting in enhanced phosphorous mobilizing activity of the consortium, which in turn results in enhanced plant growth. In many cases, the disclosed combinations provide for surprisingly enhanced phosphorus mobilizing activity.

According to one aspect of the disclosure, a consortium (a mixture of two or more distinct strains of bacteria) of bacteria for mobilizing phosphorus is created. The phosphorus mobilizing consortia includes up to 4 of the strains listed on Table 1. According to one aspect of the disclosure, a combination of any two or more of the stains of Table 1 can be used in a consortia, in other embodiments, all 4 strains are included in a consortia. In many embodiments, the various strains of modified bacteria in a consortia are identified by their 16S ribosomal gene sequences.

The present disclosure contemplates consortia for use alone, or as part of an inoculum composition, including additives, carriers and other components. The present disclosure, may also provide for nitrogen, potassium, and phosphate compounds that can be directly absorbed by plants. The present consortia modify soil nutrients and organic constituents so that plants can more effectively utilize the compounds and additives that may already be present in the surrounding soil (i.e. mobilize compounds such as phosphorous). Live beneficial microorganisms (as well as compounds, molecules, and enzymes produced by the microorganisms) within the presently disclosed compositions may break down the organic matter that is present in the soil, which is then converted to forms that are absorbable by the plants.

The compositions of the present disclosure may be used in conjunction with nitrogen, potassium, and phosphorous compounds to treat the plants. In some embodiments, the nitrogen, potassium, and phosphorous compounds are added prior to, during, or after application of the disclosed compositions. In some embodiments, the presently disclosed compositions may aid in allowing plants to more effectively absorb the applied nitrogen, potassium, and phosphorous compounds. As a result, less chemical fertilizers and lower frequency of application are required. In another embodiment, small amounts of nitrogen, potassium, and phosphorous compounds can be added to the compositions of the disclosure, which can assist the effectiveness of the consortium—that is the nitrogen, potassium, and phosphorous compounds are added during application of the disclosed compositions.

The disclosed compositions may be used to aid in the growth of a plant or seed. In many embodiments, the growth of a plant can be monitored with a variety of methods. In some embodiments, the growth of a plant may be monitored by measuring the plant's height, weight, yield (number or weight) of flowers or fruit as well as chemical attributes such as sugar content, nutrient content and protein obtained from the plant.

Use of the disclosed compositions may help increase a plant's growth relative to plants grown without the use of the disclosed compositions. In many cases, use of the disclosed compositions may enhance average growth greater than about 1%, 2%, 3%, 4%, 5%, 6%, 7%, 8%, 9%, 10%, 15%, 20%, or 30%, and less than about 40%, 30%, 20%, 15%, 10%, 9%, 8%, 7%, 6%, 5%, 4%, 3%, or 2%. The disclosed growth enhancement may be measured at various stages throughout the growth of the plant, for example from germination to harvesting of the plant, its seed, flower or fruit.

II. Compositions

Compositions useful in this disclosure include one or more bacterial microorganisms as listed in Table 1. In another aspect, the disclosed compositions include at least two or more bacterial microorganisms identifiable by homology of at least 95 or greater percent identity to the 16S ribosomal sequences of SEQ ID NOS: 1-4. In many embodiments, the amount of 16S sequence is less than about 1.2 kb, 1.1 kb, 1.0 kb, 0.9 kb, 8 kb, 0.7 kb, 0.6 kb, 0.5 kb, 0.4 kb, 0.3 kb, 0.2 kb, or 0.1 kb and greater than about 50 nt, 0.1 kb, 2 kb, 0.3 kb, 0.4 kb, 0.5 kb, 0.6 kb, 0.7 kb, 0.8 kb, 0.9 kb, 1.0 kb, or 1.1 kb. In many embodiments, the amount of 16S ribosomal sequence homology is between about 150 nt and 500 nt, for example about 250 nt.

To determine the percent identity of two nucleic acids, the sequences are aligned for optimal comparison purposes (e.g., gaps can be introduced in the sequence of a first nucleic acid sequence for optimal alignment with a second nucleic acid sequence). The nucleotides at corresponding nucleotide positions are then compared. When a position in the first sequence is occupied by the same nucleotide as the corresponding position in the second sequence, then the molecules are identical at that position. The percent identity between the two sequences is a function of the number of identical positions shared by the sequences (i.e., % identity=# of identical positions/total # of positions×100).

TABLE 1

Phosphorus Mobilizing Bacterial Nomenclature (97% similarity)

| Species | 16S Sequence (Representative OTU at 97% similarity) |
|---|---|
| 1) *Comamonas testosteroni*; SEQ ID NO: 1 | CATCGGAACGTGCCTAGTAGTGGGGGATAAC<br>TACTCNNNNNAGTAGCTAATACCGCATGAGA<br>TCTACGGATGAAAGCAGGGGACCTTCGGGCC<br>TTGTGCTACTAGAGCGGCTGATGGCAGATTA<br>GGTAGTTGGTGGGGTAAAGGCTTACCAAGCC<br>TGCGATCTGTAGCTGGTCTGAGAGGACGACC<br>AGCCACACTGGGACTGAGACACGGCCCAGAC<br>TCCTACGGGAGGCAGCAGTGGGGAATTTTGG<br>ACAATGGGCGAAAGCCTGATCCAGCAATGCC<br>GCGTGCAGGATGAAGGCCCTCGGGTTGTAAA<br>CTGCTTTTGTACGGAACGAAAAGCCTGGGGC<br>TAATATCCCCGGGTCATGACGGTACCGTAAG<br>AATAAGCACCGGCTAACTACGTGCCAGCAGC<br>CGCGGTAATACGTAGGGTGCAAGCGTTAATC<br>GGAATTACTGGGCGTAAAGCGTGCGCAGGCG<br>GTTTTGTNAAGACAGTGGTGAAATCCCCGGG<br>CTCAACCTGGGGAACTGCCATTGTGACTGCA<br>AGGCTAGAGTGCGGCAGAGGGGGATGGAATT<br>CCGCGTGTAGCAGTGAAATGCGTAGATATGC<br>GGAGGAACACCGATGGCGAAGGCAATCCCCT<br>GGGCCTGCACTGACGCTCATGCACGAAAGCG<br>TGGGGAGCAAACAGGATTAGATACCCTGGGT<br>AGTCCACGNCCCTAAACGATGTCAACTGGTT<br>GTTGGGTCTTAACTGACTCAGTAACGAAGCT<br>AACGCGTGAAGTTGACCGCCTGGGGAGTACG<br>GCCGCAAGGTTGAAACTCAAAGGAATTGACG<br>GGGACCCGCACAAGCGGTGGATGATGTGGTT<br>TAATTCGATGCAACGCGAAAAACCTTACCCA<br>CCTTTGACATGGCAGGAACTTACCAGAGATG<br>GTTTGGTGCTCGAAAGAGAACCTGCACACAG<br>GTGCTGCATGGCTGTCGTCAGCTCGTGTCGT<br>GAGATGTTGGGTTAAGTCCCGCAACGAGCGC<br>AACCCTTGCCATTAGTTGCTACATTCAGTTG<br>AGCACTCTAATGGGACTGCCGGTGACAAACC<br>GGAGGAAGGTGGGGATGACGTCAAGTCCTCA<br>TGGCCCTTATAGGTGGGGCTACACACGTCAT<br>ACAATGGCTGGTACAAAGGGTTGCCAACCCG<br>CGAGGGGGAGCTAATCCCATAAAGCCAGTCG<br>TAGTCCGGATCGCAGTCTGCAACTCGACTGC<br>GTGAAGTCGGAATCGCTAGTAATCGTGGATC<br>AGAATGNCACGGTGAATACGTTCCCGGGTCT<br>TGTACACACC |
| 2) *Pseudomonas putida*; SEQ ID NO: 2 | TGCCTAGGAATCTGCCTGGTAGTGGGGGACA<br>ACGTNNNNNAAGGAACGCTAATACCGCATAC<br>GTCCTACGGGAGAAAGCAGGGGACCTTCGGG<br>CCTTGCGCTATCAGATGAGCCTAGGTCGGAT<br>TAGCTAGTTGGTGGGGTAATGGCTCACCAAG<br>GCGACGATCCGTAACTGGTCTGAGAGGATGA<br>TCAGTCACACTGGAACTGAGACACGGTCCAG<br>ACTCCTACGGGAGGCAGCAGTGGGGAATATT<br>GGACAATGGGCGAAAGCCTGATCCAGCCATG<br>CCGCGTGTGTGAAGAAGGTCTTCGGATTGTA<br>AAGCACTTTAAGTTGGGAGGAAGGGCAGTAA |

TABLE 1-continued

Phosphorus Mobilizing Bacterial Nomenclature (97% similarity)

| Species | 16S Sequence (Representative OTU at 97% similarity) |
|---|---|
| | GTTAATACCTTGCTGTTTTGACGTTACCGAC<br>AGAATAAGCACCGGCTAACTCTGTGCCAGCA<br>GCCGCGGTAATACAGAGGGTGCAAGCGTTAA<br>TCGGAATTACTGGGCGTAAAGCGCGCGTAGG<br>TGGTTCGTTAAGTTGGATGTGAAAGCCCCGG<br>GCTCAACCTGGGAACTGCATCCAAAACTGGC<br>GAGCTAGAGTACGGTAGAGGGTGGTGGAATT<br>TCCTGTGTAGCGGTGAAATGCGTAGATATAG<br>GAAGGAACACCAGTGGCGAAGGCGACCACCT<br>GGACTGATACTGACACTGAGGTGCGAAAGCG<br>TGGGGAGCAAACAGGATTAGATACCCTGGTA<br>GTCCACGCCGTAAACGATGTCAACTAGCCGT<br>TGGAATCCTTGAGATTTTAGTGGCGCAGCTA<br>ACGCATTAAGTTTGACCGCCTGGGGAGTACG<br>GCCGCAAGGTTAAAACTCAAATGAATTGACG<br>GGGGCCCGCACAAGCGGTGGAGCATGTGGTT<br>TAATTCGAAGCAACGCGAAGAAACCTTACCA<br>GGCCTTGACATGCAGAGAACTTTCCAGAGAT<br>GGATTGGTGCCTTCGGGAACTCTGACACAGG<br>TGCTGCATGGCTGTCGTCAGCTCGTGTCGTG<br>AGATGTTGGGTTAAGTCCCGTAACGAGCGCA<br>ACCCTTGTCCTTAGTTACCAGCACGTTATGG<br>TGGGCACTCTAAGGAGACTGCCGGTGACAAA<br>CCGGAGGAAGGTGGGGATGACGTCAAGTCAT<br>CATGGCCCTTACGGCCTGGGCTACACACGTG<br>CTACAATGGTCGGTACAGAGGGTTGCCAAGC<br>CGCGAGGTGGAGCTAATCTCACAAAACCGAT<br>CGTAGTCCGGATCGCAGTCTGCAACTCGACT<br>GCGTGAAGTCGGAATCGCTAGTAATCGCGAA<br>TCAGAANGNNGCGGTGAATACGTTCCCGGGC<br>CTTGTACACACCGCC |
| 3) *Citrobacter freundii*; SEQ ID NO: 3 | AGTAATGTCTGGGAAACTGCCCGATGGAGGG<br>GGATNNNTNCTGGAAACGGTAGCTAATACCG<br>CATAACGTCGCAAGACCAAAGAGGGGGACCT<br>TCGGGCCTCTTGCCATCGGATGTGCCCAGAT<br>GGGATTAGCTAGTAGGTGGGGTAACGGCTCA<br>CCTAGGCGACGATCCCTAGCTGGTCTGAGAG<br>GATGACCAGCCACACTGGAACTGAGACACGG<br>TCCAGACTCCTACGGGAGGCAGCAGTGGGGA<br>ATATTGCACAATGGGCGCAAGCCTGATGCAG<br>CCATGCCGCGTGTATGAAGAAGGCCTTCGGG<br>TTGTAAAGTACTTTCAGCGAGGAGGAAGGNN<br>TTGTGGTTAATAACCGCAGTGATTGACGTTA<br>CTCGCAGAAGAAGCACCGGCTAACTCCGTGC<br>CAGCAGCCGCGGTAATACGGAGGGTGCAAGC<br>GTTAATCGGAATTACTGGGCGTAAAGCGCAC<br>GCAGGCGGTCTGTCAAGTCGGATGTGAAATC<br>CCCGGGCTCAACCTGGGAACTGCATCCGAAA<br>CTGGCAGGCTAGAGTCTTGTAGAGGGGGGTA<br>GAATTCCAGGTGTAGCGGTGAAATGCGTAGA<br>GATCTGGAGGAATACCGGTGGCGAAGGCGGC<br>CCCCCTGGACAAAGACTGACGCTCAGGTGCG<br>AAAGCGTGGGGAGCAAACAGGATTAGATACC<br>CTGGTAGTCCACGCCGTAAACGATGTCGACT<br>TGGAGGTTGTGCCCTTGAGGCGTGGCTTCCG<br>GAGCTAACGCGTTAAGTCGACCGCCTGGGGA<br>GTACGGCCGCAAGGTTAAAACTCAAATGAAT<br>TGACGGGGGCCCGCACAAGCGGTGGAGCAT<br>GTGGTTTAATTCGATGCAACGCGAAGAACCT<br>TACCTACTCTTGACATCCAGAGAANTTNGCA<br>GAGATGCTNNNNNTGCCTTCGGGAACTNCTG<br>AGACAGGTGCTGCATGGCTGTCGTCAGCTCG<br>TGTTGTGAAATGTTGGGTTAAGTCCCGCAAC<br>GAGCGCAACCCTTATCCTTTGTTGCCAGCGG<br>TTCGGCCGGGAACTCAAAGGAGACTGCCAGT<br>GATAAACTGGAGGAAGGTGGGGATGACGTCA<br>AGTCATCATGGCCCTTACGAGTAGGGCTACA<br>CACGTGCTACAATGGCATATACAAAGAGAAG<br>CGACCTCGCGAGAGCAAGCGGACCTCATAAA<br>GTATGTCGTAGTCCGGATTGGAGTCTGCAAC<br>TCGACTCCATGAAGTCGGAATCGCTAGTAAT<br>CGTGGATCAGAANNNCNCGGTGAATACGTTC<br>CCGGGCCTTGTACACACC |

TABLE 1-continued

Phosphorus Mobilizing Bacterial Nomenclature (97% similarity)

| Species | 16S Sequence (Representative OTU at 97% similarity) |
|---|---|
| 4) *Enterobacter cloacae*; SEQ ID NO: 4 | CTNATACCNCNTAANGTCNCAAGACCNAANA<br>GGGGGNNNNTNNGGCCTCTTGNCNTCNNATG<br>TGNCCNNATGGGATTANCTNGTANGTGGGGT<br>AACNNNTCNCCNNNNCGACNATNCCTNNNTG<br>GNNTNAGAGGATGACCNNNCNCNCTNNNNCT<br>GAGACACGGNCCANACNCCNNCNNGANGNNN<br>NNNTGGGGAATATTGCNNCAATGGGNGCNAG<br>CCTGATGCANNCATGCCNCGTGTATGAANAA<br>NGNCTTCNGGTTGTNAAGTACTTTCNNCNGG<br>GAGGAANGNGTTGAGGNTNNTNNNCTCANCA<br>ATTGACGNTNCCCNCANAANAANCACCGGCT<br>AACTCCGTGCCAGCAGCCGCGGTAATACNGA<br>GGGTGCAAGCGTTNATCGGAATTACTGGGCG<br>TAAAGCGCACGCAGGCGGTCTGTCAAGTCNG<br>ATGTGAAATCCCCGGGCTCAACCTGGGAACT<br>GCATTCNAAACTGGCAGGCTAGAGTCTTGTN<br>NAGGGGGGNAGAATTCCNGGTGTAGCGGTGA<br>AATGCGTAGAGATCTGGAGGAATACCGGTGG<br>CGAAGGCGGCCCCCTGGACAAAGACTGACGC<br>TCAGGTGCGAAAGCGTGGGGAGCAAACAGGA<br>TTAGATACCCTGGTAGTCCACGCCGTAAACG<br>ATGTCGACTTGGAGGTTGTGCCCTTGAGGCG<br>TGGCTTCCGGAGCTAACGCGTTAAGTCGACC<br>GCCTGGGGAGTACGGCCGCAAGGTTAAAACT<br>CAAATGAATTGACGGGGGCCCGCACAAGCGG<br>TGGAGCATGTGGTTTAATTCGATGCAACGCG<br>AAGAACCTTACCTACTCTTGACATCCAGAGA<br>ACTTNNCAGAGATNNNTNGGTGCCTTCGGGA<br>ACTCTGAGACAGGTGCTGCATGGCTGTCGTC<br>AGCTCGTGTTGTGAAATGTTGGGTTAAGTCC<br>CGCAACGAGCGCAACCCTTATCCTTTGTTGC<br>CAGCGGTTNGGCCGGGAACTCAAAGGAGACT<br>GCCAGTGATAAACTGGAGGAAGGTGGGGATG<br>ACGTCAAGTCATCATGGCCCTTACGAGTAGG<br>GCTACACACGTGCTACAATGGCGCATACAAA<br>GAGAAGCGACCTCGCGAGAGCAAGCGGACCT<br>CATAAAGTGCGTCGTAGTCCGGATTGGAGTC<br>TGCAACTCGACTCCATGAAGTCGGAATCGCT<br>AGTAATCGTAGATCAGAATGCTACGGTGAAT<br>ACGTTCCCGGGCCTTGTACACACCGCCNGNC<br>ACNCCATGGGAGTGGGTTGCAAAAGAAGTAG<br>GTAGCTTANCCTTCGGGAGGGNNCT |

The determination of percent homology between two sequences may be accomplished using a mathematical algorithm. A preferred, non-limiting example of a mathematical algorithm utilized for the comparison of two sequences is the algorithm of Karlin and Altschul (1990) Proc. Nat'l Acad. Sci. USA 87:2264-2268, modified as in Karlin and Altschul (1993) Proc. Nat'l Acad. Sci. USA 90:5873-5877. Such an algorithm is incorporated into the NBLAST and XBLAST programs of Altschul, et al. (1990) J. Mol. Biol. 215:403-410. BLAST nucleotide searches can be performed with the NBLAST program, score=100, word length=12 to obtain nucleotide sequences similar or homologous to nucleic acid molecules of the present disclosure. To obtain gapped alignments for comparison purposes, Gapped BLAST can be utilized as described in Altschul et al. (1997) Nucleic Acids Res. 25:3389-3402. When utilizing BLAST and Gapped BLAST programs, the default parameters of the respective programs (e.g., XBLAST and NBLAST) can be used. These algorithms may be used to align DNA with RNA, and in some cases may be used to align proteins with translated nucleotide sequences.

Preferably, at least two or more microorganisms are included in the compositions of the present disclosure. It is contemplated that where two or more microorganisms form the composition, the microorganisms may be co-cultured to produce the disclosed composition. In other embodiments, the disclosed composition may be formed by combining individual cultures of the two or more strains. The microorganisms may be propagated by methods known in the art. For example, the microorganisms may be propagated in a liquid medium under anaerobic or aerobic conditions. Suitable liquid mediums used for growing microorganism include those known in the art such as Nutrient Broth and Tryptic soy agar (TSA), etc. In a most preferred embodiment, the composition includes the entire listing of the 4 strains listed in Table 1.

In one aspect, the composition includes a total number of microorganisms of about one to about 10 billion colony-forming units (CFU) per milliliter. Preferably, the composition includes a total number of microorganisms of about 100,000 to about 800,000 CFU per milliliter. More preferably, the composition includes a total number of microorganisms of about 250,000 to about 600,000 CFU per milliliter. Most preferably, the composition includes a total number of microorganisms of about 300,000 CFU per milliliter.

In one aspect, the composition includes living and non-living microorganisms. In another aspect, the composition includes living or non-living microorganisms. Compositions containing non-living microorganisms may contain extracts of microorganisms, for example extracts of the microorganisms of Table 1, or other bacteria. The extracts of microorganisms include, by way of example, enzymes, metabolites, proteins, and other substances that are produced by microorganisms and are capable of eliciting an effect on an environment. In some embodiments, extracts may be liquid fermentation products of on or more microorganisms, such as those of Table 1. In some embodiments, extracts may be purified using standardized biochemical purification protocols.

In one aspect, the composition is fermented to produce a fermentation product. The composition may be fermented for about 1, 2, 3, 4, 5, 6, 7, 8, 9, 10, 11, 12, 13, 14, 15, 16, 17, 18, 19, 20, 21, 22, 23, 24, 25, or more days. Preferably, the composition is fermented for at least about one to about 5 days. More preferably, the composition is fermented for at least 3 days.

The compositions may also include additives. Suitable additives include substances known in the art that may support growth, production of specific metabolites by the microorganism, alter pH, enrich for target metabolites, enhance insecticidal effects, and combinations thereof. Exemplary additives include carbon sources, nitrogen sources, phosphorous sources, inorganic salt, organic acid, growth media, vitamins, minerals, acetic acid, amino acids and the like.

Examples of suitable carbon sources include, without limitation, starch, peptone, yeast extract, amino acids, sugars such as sucrose, glucose, arabinose, mannose, glucosamine, maltose, sugar cane, alfalfa extracts, molasses, rum, and the like; salts of organic acids such as acetic acid, fumaric acid, adipic acid, propionic acid, citric acid, gluconic acid, malic acid, pyruvic acid, malonic acid and the like; alcohols such as ethanol, glycerol, and the like; oil or fat such as soybean oil, rice bran oil, olive oil, corn oil, and sesame oil. The amount of the carbon source added varies according to the kind of carbon source and is typically between 1 to 100 grams per liter of medium. The weight fraction of the carbon source in the composition may be about 98% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the composition. Preferably, alfalfa is contained in the medium as a major carbon source, at a concentration of about 1 to 20% (w/v). More preferably, the alfalfa is at a concentration of about 5 to 12% (w/v).

Examples of suitable nitrogen sources include, without limitation, amino acids, yeast extract, alfalfa extract, tryptone, beef extract, peptone, potassium nitrate, ammonium nitrate, ammonium chloride, ammonium sulfate, ammonium phosphate, ammonia or combinations thereof. The amount of nitrogen source varies according to the nitrogen source, typically between 0.1 to 30 grams per liter of medium. The weight fraction of the nitrogen source in the composition may be about 98% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the composition.

Examples of suitable inorganic salts include, without limitation, potassium dihydrogen phosphate, dipotassium hydrogen phosphate, disodium hydrogen phosphate, magnesium sulfate, magnesium chloride, ferric sulfate, ferrous sulfate, ferric chloride, ferrous chloride, manganous sulfate, manganous chloride, zinc sulfate, zinc chloride, cupric sulfate, calcium chloride, sodium chloride, calcium carbonate, sodium carbonate, and combinations thereof. The weight fraction of the inorganic salt in the composition may be about 98% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the composition.

In another embodiment, the compositions of the present disclosure may further comprise acetic acid or carboxylic acid. Suitable acetic acids include any known in the art including, without limitation, formic acid, acetic acid, propionic acid, butanoic acid, isobutyric acid, 3-methyl butanoic acid, methyl acetate ethyl acetate, propyl acetate, butyl acetate, isobutyl acetate, and 2-methyl butyl acetate. In one embodiment, the acetic acid is included by using vinegar. The weight fraction of the acetic acid in the composition may be about 98% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the composition.

The compositions of the present disclosure may be in liquid or dry form. The composition may comprise an aqueous suspension of components. This aqueous suspension may be provided as a concentrated stock solution which is diluted prior to application or as a diluted solution ready-to-use. Also, the composition may be a powder, granules, dust, pellet or colloidal concentrate. Such dry forms may be formulated to dissolve immediately upon wetting or dissolve in a controlled-release, sustained-release, or other time-dependent manner. Also, the composition may be in a dry form that does not depend upon wetting or dissolving to be effective. The compositions may additionally be provided in a formulation capable of spray. The spray may be a liquid or an aerosol.

In some embodiments, the composition of the present disclosure may comprise at least one optional excipient. Non-limiting examples of suitable excipients include antioxidants, additives, diluents, binders, fillers, buffering agents, mineral salts, pH modifying agents, disintegrants, dispersing agents, flavoring agents, nutritive agents, oncotic and osmotic agents, stabilizers, preservatives, palatability enhancers and coloring agents. The amount and types of excipients utilized to form the combination may be selected according to known principles of science.

In one embodiment, the excipient may include at least one diluent. Non-limiting examples of suitable diluents include microcrystalline cellulose (MCC), cellulose derivatives, cellulose powder, cellulose esters (i.e., acetate and butyrate mixed esters), ethyl cellulose, methyl cellulose, hydroxypropyl cellulose, hydroxypropyl methylcellulose, sodium carboxymethylcellulose, corn starch, phosphated corn starch, pregelatinized corn starch, rice starch, potato starch, tapioca starch, starch-lactose, starch-calcium carbonate, sodium starch glycolate, glucose, fructose, lactose, lactose monohydrate, sucrose, xylose, lacitol, mannitol, malitol, sorbitol, xylitol, maltodextrin, and trehalose.

In another embodiment, the excipient may comprise a binder. Suitable binders include, but are not limited to, starches, pregelatinized starches, gelatin, polyvinylpyrrolidone, cellulose, methylcellulose, sodium carboxymethylcellulose, ethylcellulose, polyacrylamides, polyvinyloxoazolidone, polyvinylalcohols, C12-C18 fatty acid alcohol, polyethylene glycol, polyols, saccharides, oligosaccharides, polypeptides, oligopeptides, and combinations thereof.

In another embodiment, the excipient may include a filler. Suitable fillers include, but are not limited to, carbohydrates, inorganic compounds, and polyvinylpyrrolidone. By way of non-limiting example, the filler may be calcium sulfate, both di- and tri-basic, starch, calcium carbonate, magnesium carbonate, microcrystalline cellulose, dibasic calcium phosphate, magnesium carbonate, magnesium oxide, calcium silicate, talc, modified starches, lactose, sucrose, mannitol, or sorbitol.

In still another embodiment, the excipient may comprise a buffering agent. Representative examples of suitable buffering agents include, but are not limited to, MOPS, HEPES, TAPS, Bicine, Tricine, TES, PIPES, MES, Tris buffers or buffered saline salts (e.g., Tris buffered saline or phosphate buffered saline).

In a further embodiment, the excipient may include a disintegrant. Suitable disintegrants include, but are not limited to, starches such as cornstarch, potato starch, pregelatinized and modified starches thereof, sweeteners, clays, such as bentonite, microcrystalline cellulose, alginates, sodium starch glycolate, gums such as agar, guar, locust bean, karaya, pecitin, and tragacanth.

In yet another embodiment, the excipient may include a dispersion enhancer. Suitable dispersants may include, but are not limited to, starch, alginic acid, polyvinylpyrrolidones, guar gum, kaolin, bentonite, purified wood cellulose, sodium starch glycolate, isoamorphous silicate, and microcrystalline cellulose.

In a further embodiment, the excipient may include a lubricant. Non-limiting examples of suitable lubricants include minerals such as talc or silica; and fats such as vegetable stearin, magnesium stearate or stearic acid.

The weight fraction of the excipient(s) in the combination may be about 98% or less, about 95% or less, about 90% or less, about 85% or less, about 80% or less, about 75% or less, about 70% or less, about 65% or less, about 60% or less, about 55% or less, about 50% or less, about 45% or less, about 40% or less, about 35% or less, about 30% or less, about 25% or less, about 20% or less, about 15% or less, about 10% or less, about 5% or less, about 2%, or about 1% or less of the total weight of the combination.

Figure 2:
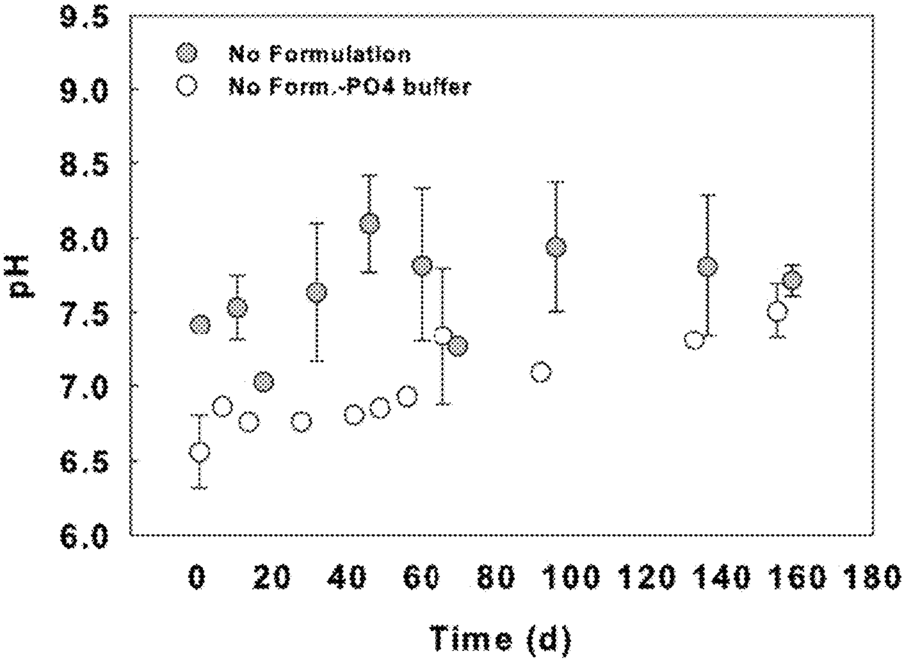
FIG. 2. Scatter plot shows stable pH levels in liquid alfalfa media with or without added $PO_4$ buffer.

The compositions of the present disclosure are stable under various conditions with respect to bacterial colony forming units (cfu/ml) concentrations (FIG. 1) and pH levels over time (FIG. 2) as a liquid or dry form. Preferably, the compositions of the present disclosure are stable at room temperature.

In another aspect of the present disclosure, the consortia may be kept at a reduced temperature for storage and transportation without significantly compromising the viability of the live microorganisms. The consortia or compositions comprising the same may be refrigerated, frozen, or lyophilized. The compositions may be refrigerated at between 32° F. to 44° F.

In another aspect of the present disclosure, the consortium or compositions comprising the same can be stored and transported in a frozen state. The live beneficial microorganisms can be reinvigorated quickly once the compositions are thawed and brought to ambient temperature, preferably with aeration and/or agitation.

In yet another aspect of the present disclosure, the consortia can be lyophilized. The consortia is first frozen. Water is then removed amendments under vacuum. This process further reduces the weight of the composition for storage and transportation. The consortia of compositions comprising the same can be reconstituted and reinvigorated prior to application.

In another aspect of the present disclosure, the concentrated consortia, or compositions comprising the same can be diluted with water before application to seed, plants, soil or the like. Diluted compositions can be stored for a prolonged period of time, e.g., as long as 30 days, without losing viability. To maintain the live beneficial microorganism in a substantially aerobic state, dissolved oxygen in the diluted compositions of the present disclosure are preferably kept at an optimal level. It is preferable to supply optimal amounts of oxygen to the diluted composition though slow aeration.

III. Methods

The compositions disclosed herein are useful in agriculture, and as chemical/fertilizer replacements for increasing available phosphorus for plants. The compositions disclosed herein are useful in agriculture methods. Methods of the present disclosure include soil enrichment and plant enrichment.

Methods of soil treatment include applying the composition to the soil to be enriched. The composition may be in liquid or dry form and applied to the soil by methods known in the art. Exemplary methods include spraying, dropping, scattering, and dusting the target soil. Also, the composition may be applied to a water source that feeds the target soil.

In another aspect, the composition may be used for plant enrichment. Methods of plant enrichment include applying the compositions of the present disclosure to the soil or water source of the plant as described herein. In another aspect, seeds may be soaked in a composition of the present disclosure prior to planting. It will be recognized that it may be beneficial to combine any of the methods described herein for soil and plant enrichment.

The microorganism composition may be provided either dried or in liquid form. The microorganism composition may be provided in a variety of amounts with respect to the weight of the soil or plant. In some aspects, the microorganism composition is provided in an amount ranging from about 0.5 to 50 wt. % of the total weight of the soil or plant. In another aspect, the microorganism composition is provided in an amount ranging from about 1 to about 3 wt. % of the total weight of the soil or plant The microorganism may be provided in either dry form, liquid form or through the spray. Methods of treating waste products include without limitation, spraying, dusting, sprinkling, liquid inoculation, misting, fumigating, aerosolizing, and other methods known in the art.

To facilitate a better understanding of the embodiments of the present disclosure, the following examples are given. In no way should the following examples be read to limit, or to define, the scope of the present disclosure.

EXAMPLES

Example 1

Applicants extracted the natural soil microbial communities from soils across the US from agriculture and natural grassland and forested sites representative of a wide range of climate, soil characteristics, and vegetation types including major production crops (soybean, wheat and corn). The microbes were propagated in a defined media resembling different P-limiting conditions. The media provides a unique environment, which allows Applicants to control the nutrient stoichiometry to adapt the growth of soil microbes to many different environmental conditions. For example, for growing microbes in typical acidic soils, the nutrient stoichiometry would be controlled by using an insoluble P found in ferric ($FePO_4$) and aluminum ($AlPO_4$) substrates Table 2.1; 2.2.

TABLE 2.1

Example of defined media using Ferric ($FePO_4$) and aluminum ($AlPO_4$) substrates

| Chemical Name | Nutrient | Desired Concentration (M/L Media) | Chemical Formula |
|---|---|---|---|
| MES buffer | buffer | 0 | C6H13NO4S |
| MOPS Buffer | buffer | 0.05 | C7H15NO4S |
| TAPS | buffer | 0 | C7H17NO6S |
| D-glucose | carbon and nitrogen N | 0.006660746 | C6H12O6 |
| Glycine | carbon and nitrogen | 0.000532836 | C2H5NO2 |
| L-Histidine | carbon and nitrogen | 0.000257815 | C6H9N302 |
| L-Methionine | carbon and nitrogen | 0.000134039 | C5H11NO2S |
| L-Tryptophan | carbon and nitrogen | 9.79312E−05 | C11H12N2O2 |
| Ammonium chloride | nitrogen | 0.14955787 | NH4Cl |
| Monosodium phosphate | phosphorus | 0 | NaH2PO4 |
| (Ferric) Iron(III) phosphate dihydrate | phosphorus | 0.001605566 | FePO4*2H2O |
| Aluminum phosphate | phosphorus | 0.002049972 | AlPO4 |
| Aluminum phosphate monobasic | phosphorus | 0 | Al(H2PO4)3 |
| Dicalcium phosphate | phosphorus | 0 | CaHPO4 |
| Hydroxylapatite | phosphorus | 0 | Ca5(PO4)3(OH) |
| Monocalcium phosphate | phosphorus | 0 | CaH4P2O8 |
| Tricalcium phosphate | phosphorus | 0 | Ca3O8P2 |
| Phytic acid solution | phosphorus | 0 | C6H18O24P6 |
| Phytic acid sodium salt hydrate | phosphorus | 0 | C6H18O24P6 |
| Ammonium iron(II) sulfate hexahydrate | macronutrient | 0 | (NH4)2Fe(SO4)2 · 6H2O |
| Calcium chloride | macronutrient | 0.004081244 | CaCl*2H2O |
| Magnesium sulfate | macronutrient | 0.006492 | MgSO4*7H2O |
| Potassium Sulfate | macronutrient | 0.006886 | K2SO4 |
| Sodium chloride | macronutrient | 0.020534 | NaCl |
| Boric acid | micronutrient | 9.70403E−07 | H3BO3 |
| Cobalt(II) sulfate | micronutrient | 1.35183E−06 | CoSO4*7H2O |
| Copper(II) sulfate | micronutrient | 8.00961E−08 | CuSO4*5H2O |
| Manganese(II) sulfate | micronutrient | 4.73317E−06 | MnSO4*2H2O |
| Nickel(II) chloride | micronutrient | 2.10358E−07 | NiCl2*6H2O |
| Nitrilotriacetic acid | micronutrient | 5.23177E−06 | C6H9NO6 |
| Potassium alum | micronutrient | 8.43188E−08 | KAl(SO4)2*12H2O |
| Sodium molybdate | micronutrient | 2.06654E−07 | Na2MoO4*2H2O |
| Sodium selenite | micronutrient | 3.46941E−06 | Na2SeO3*5H2O |
| Zinc sulfate | micronutrient | 6.9558E−08 | ZnSO4*7H2O |
| 4-aminobenzoic acid | vitamins | 1.45836E−06 | C7H7NO2 |
| Biotin | vitamins | 2.4559E−07 | C10H16N2O3S |
| d- Ca-pantothenate | vitamins | 9.12284E−07 | C9H17NO5 |
| Folic acid | vitamins | 4.53104E−07 | C19H19N7O6 |
| L-Ascorbic acid | vitamins | 1.13559E−06 | C6H8O6 |
| Lipoic acid | vitamins | 9.69321E−07 | C8H14O2S2 |

TABLE 2.1-continued

Example of defined media using Ferric ($FePO_4$) and aluminum ($AlPO_4$) substrates

| Chemical Name | Nutrient | Desired Concentration (M/L Media) | Chemical Formula |
|---|---|---|---|
| Nicotinic acid | vitamins | 1.62457E−06 | C6NH5O2 |
| pyridoxine HCI | vitamins | 1.18217E−06 | C8H11NO3 |
| Riboflavin | vitamins | 5.31406E−07 | C17H20N4O6 |
| Thiamine hydrochloride | vitamins | 6.64872E−07 | C12H17ClN4OS |
| Vitamin B12 (i.e. Cyanocobalamin) | vitamins | 1.4756E−08 | C63H88CoN14O14P |

TABLE 2.2

Example of nutrient stoichiometry limits in Ferric (FePO4) and aluminum (AlPO4) media C: Nutrient content in Media

| | |
|---|---|
| C/N | 1.960295009 |
| C/P | 107.9008086 |
| C/S | 6.209541778 |
| C/K | 28.640332 |
| C/Mg | 60.75740407 |
| C/Ca | 96.64628501 |
| C/Fe | 245.6685534 |

Figure 3:
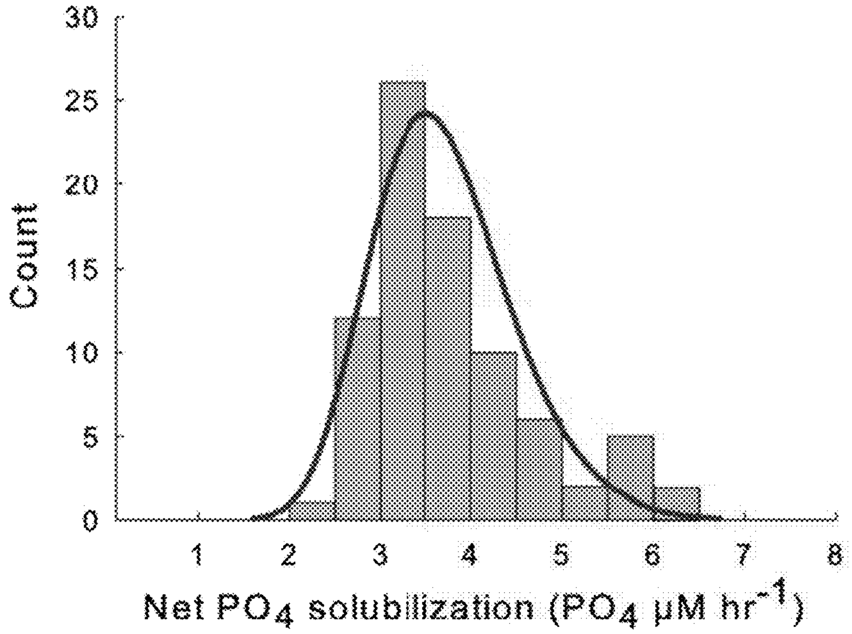
FIG. 3. Frequency histogram showing wide variability in microbial inorganic P solubilization and among bacterial communities isolated from natural grassland soils FIG. 4. Bacterial P solubilization capacities observed which eventually plateau by generation #27 after progressively rapid improvement from generation #1; representing increasingly superior consortia selected for improvement in phosphorus solubilization rates through subsequent generations.

The microbial growth rate at which microbial communities from these soils produced soluble orthophosphate was quantified and the results shown in FIG. 3. These microbial communities differed widely in their rate of orthophosphate mineralization and the accumulation of P in microbial biomass, which we assayed using a phosphate detection system protocol (Taylor et al. 2013). Using this approach, Applicants were able to subsequently select rare microbial consortia that exhibited five-ten times more than the average P-solubilization rates or organic-$PO_4$ mineralization traits, including those with the fastest rates and/or higher magnitudes of P solubilization and mineralization (FIG. 3).

Figure 4:
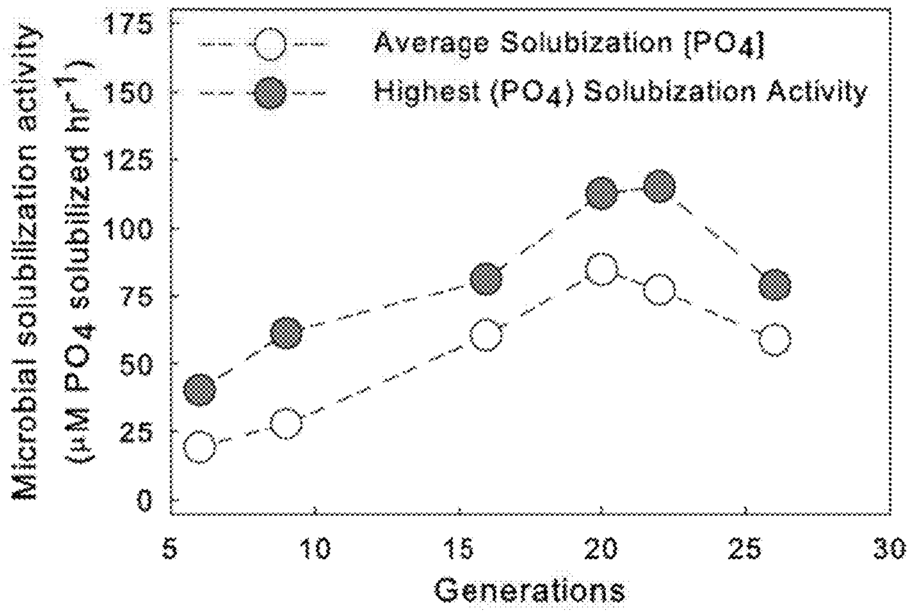

Next, to improve upon the superior P solubilization and mineralization demonstrated by these microbial consortia, the high throughput characterization platform (to evaluate microbial traits) was combined with the use of directed artificial selection wherein the bacteria were modified through a breeding process that resulted in enhanced phosphorous mobilization activity. Directed microbial community orthophosphate solubilization and mineralization selection was accomplished by first inoculating superior consortia that showed enhanced mobilization (identified during the characterization and screening of microbial consortia P efficacies) into 96 deep well plates containing our selection media. Because relatively small "seed" community were added to each of the 96 replicates, slight shifts in community composition was achieved within each replicate simply through natural variability and random ecological factors at play during community assembly (McGrady-Steed et al., 1997; Van Der Gast et al., 2008; Nemergut et al., 2013). In each subsequent generation desirable consortia were identified based on their ability to solubilize or mineralize orthophosphate (FIG. 4). In addition, during directed selection microbial mutation and horizontal gene transfer was accelerated via UV exposure or mutagenic agents. The consortium with the highest rate of P solubilization was selected as the seed community to be used to inoculate the subsequent generation. The resultant consortia consist of a novel combination of bacterial strains that differ substantially from the communities found in natural soils, and demonstrate surprisingly enhanced P mobilization.

Bacteria for use with the presently disclosed consortia are disclosed in Table 1 (Phosphorus mobilizing consortia). The strains are identifiable by their 16S ribosomal representative sequence for their operational taxonomic units reported in the tables. According to the present disclosure, two or more of these identified strains may be used to increase plant available phosphorus in soil. In a preferred embodiment, the strains are those including representative OTU at 97% similarity at least over about 0.2 kb of 16S sequences (Table 1). Once optimized, we used media that simulates insoluble P conditions typically found in acidic soils using ferric ($FePO_4$) and aluminum ($AlPO_4$) substrates Table 2.1.

We have been able to successfully stabilize bacterial growth after the initial fermentation period with several different media formulations such as alfalfa media. For these experiments, alfalfa media was created by using a heat and water extraction protocol. In brief, about 80 g alfalfa substrate (contained in fine mesh nylon boiling bags) was combined with about 1 gallon of water, and boiled (~100° C.) in a stainless steel brew kettle for about 60 minutes. Heat and water helps to extract carbon compounds and nutrients from the alfalfa that may aid in growing the disclosed bacterial consortia. The heat and water extraction method also serves to at least partially sterilize the alfalfa extract. After boiling for 60 minutes, the water-alfalfa mixture remains covered in the brew kettle, removed from the heating element, and allowed to slowly cool down (to ~60° C.) over the next 12 hours. After the cooling period, the alfalfa-liquid extract is aseptically transferred the into sterile glass bottles and stored at 4° C. until use.

Other methods have been able to stabilize bacterial growth after the initial fermentation period. In many of these methods, various stabilizing formulations were mixed, autoclaved, cooled, and then incorporated into the bacterial inoculum at different concentrations and volumes ranging between 0.001%-50%-total volume. The formulation additives may include: Sorbitol, Glucose, Lactose, Trehalose, Glycerol, PEG, Glycine, and/or Proline.

Example 2—Evaluation of Bacterial Consortia Improvements for Mobilizing Phosphorus We conducted an in vitro assay to quantify improvements in the ability of our bacterial consortia to mobilize orthophosphate ($PO_4$) compared to other bacterial isolates (i.e. in pure culture). Surprisingly, the disclosed consortia showed enhanced mobilization beyond the expected amounts. Indeed, a synergistic effect was seen when two or more individual bacterial strains were included in the consortia. This was surprising as different bacterial strains would normally be expected to inhibit each other.

To compare bacterial isolates (listed in Table 1) various combinations of isolates working together as a consortia were prepared. The bacteria were grown from frozen stock samples of various bacterial species isolates (previously grown in our ferric and aluminum media (listed above) and then stored frozen as subsamples in 2 mL sterile microcentrifuge tubes at −80° C.). Bacterial isolate samples were grown for this experiment by inoculating a total volume of 1 mL concentrated bacteria into 19 mL of sterile alfalfa media (prepared as disclosed above). 20 mL of each bacterial isolate (Table 1) was grown by inoculating 1 mL of frozen bacterial stock culture (for each species independently) into 19 mL of alfalfa media. Each isolated bacterial species culture was grow in the alfalfa media for 3 days (at 25° C.) in an incubator until each of the isolated cultures was at a concentration of about $10^9$ CFU/mL.

We then conducted a full factorial design using four replicates for every factor group (Table 3.1) to test the interactive abilities of bacterial species to mobilize $PO_4$ using a 96-deep well plate format. For the bacterial isolates, we inoculated 50 ul of total mature culture into 950 uL alfalfa media. However, to combine isolates into different bacterial consortia assemblages, we used the same total inoculum ratio (50 ul of total mature culture into 950 uL alfalfa media), but recombined multiple bacterial isolates into a consortia based on the bacterial relative proportions as was observed in the high throughput molecular community analysis (Table 3.1; Table 3.2). The bacterial cultures grew in the 96-deep well plates for 3 days (in an incubator at 25° C.) until each of the isolated cultures reached a concentration of $10^9$ CFU/mL. After the three day growth period, all samples (bacterial isolates and combinations of bacteria representing different consortia assemblages) were simultaneously assessed for increased $PO_4$ availability.

Figure 5:
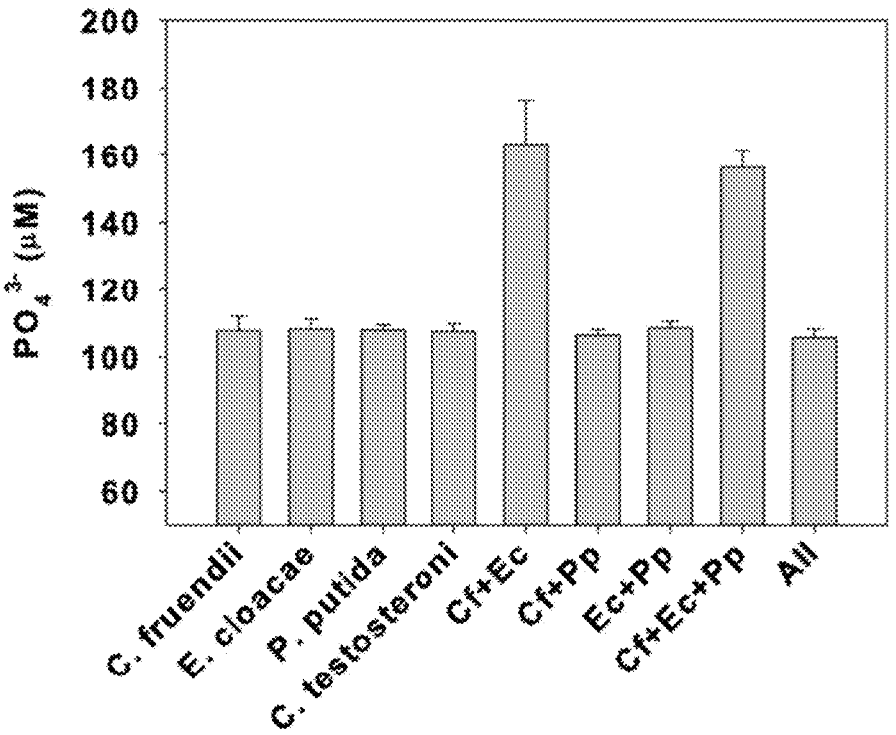
FIG. 5 is graphs showing the ability of all microbial isolates and combinations of isolates to make orthophosphate ($PO_4$) more available. These findings demonstrate how improved orthophosphate ($PO_4$) mobilization can occur with the synergies of multiple bacterial species. More specifically, a consortia with two species, including *Enterobacter cloacae* (Ec) and *Citrobacter freundii*(Cf) demonstrate the strongest synergistic improvement in $PO_4$ mobilization; but a synergistic improvement to a slightly lesser degree was also observed when including *Pseudomonas putida* (Pp). Bacterial isolates do not demonstrate the same additive benefit to improve $PO_4$ mobilization when compared to the consortia effect.

The findings in this incubation study demonstrate how improved orthophosphate ($PO_4$) mobilization can be achieved and the synergistic effect of including multiple bacterial species in a consortium. These data demonstrate that the ability to mobilize phosphorus is greatly improved by the addition of two or more disclosed bacterial species, such that the rate of phosphorus mobilization is greater for the consortia than the additive rates of the consortia members in isolation. More specifically, the strongest synergistic improvements in $PO_4$ mobilization were observed with a two species consortia (including *Enterobacter cloacae* (E) and *Citrobacter freundii* (C)) and three species consortia (including *Enterobacter cloacae* (E) and *Citrobacter freundii* (C) and *Pseudomonas putida* (P)) (FIG. 5). This result was unexpected. Rather in most cases one bacterial species will inhibit the growth and metabolism of a second bacterial species in the same culture.

TABLE 3.1

Full factorial design to test interactive effects between the four target species for improved orthophosphate ($PO_4$) mobilization. Values below represent relative proportions (μL) to achieve a final volume of 50 μL to add to 950 μL in each well of the 96-deep well plates. Each culture was at $10^9$ CFU counts at time of the mixing.

| Factor group | *C. fruendii* (μL) | *E. cloacae* (μL) | *P. putida* (μL) | *C. testosteroni* (μL) |
|---|---|---|---|---|
| All | 10 | 15 | 20 | 5 |
| Cf + Ec + Pp | 11.1 | 16.7 | 22.2 | 0 |
| Cf + Pp + Ct | 14.3 | 0 | 28.6 | 7.1 |
| Ec + Pp + Ct | 0 | 18.75 | 25 | 6.25 |
| Cf + Ec + Ct | 16.7 | 25 | 0 | 8.3 |
| Cf + Pp | 16.7 | 0 | 33.4 | 0 |
| Cf + Ec + Ct | 20 | 0 | 20 | 10 |
| Ec + Pp | 0 | 21.4 | 28.6 | 0 |
| Ct + Ec + Pp | 0 | 25 | 16.7 | 8.3 |
| Ct + Pp | 0 | 0 | 40 | 10 |
| Ec + Pp | 0 | 25 | 16.7 | 8.3 |
| Cf + Ec | 20 | 30 | 0 | 0 |
| Cf + Ct | 33.3 | 0 | 0 | 16.7 |
| Cf + Pp | 25 | 0 | 25 | 0 |
| Ec + Pp | 0 | 30 | 20 | 0 |
| Ec + Ct | 0 | 37.5 | 0 | 12.5 |
| Ct + Pp | 0 | 0 | 33.3 | 16.7 |
| *C. fruendii* | 50 | 0 | 0 | 0 |
| *E. cloacae* | 0 | 50 | 0 | 0 |
| *P. putida* | 0 | 0 | 50 | 0 |
| *C. testosteroni* | 0 | 0 | 0 | 50 |

TABLE 3.2

Bacterial community structure, colony forming units (CFU's) and relative abundances for our soil $PO_4$ mobilizing bacterial consortia

| Bacterial Species | CFU/mL | Relative abundances |
|---|---|---|
| *Enterobacter cloacae* | 80,000,000 | 0.4 |
| *Citrobacter fruendii* | 60,000,000 | 0.3 |
| *Comamonas testosteroni* | 40,000,000 | 0.2 |
| *Psuedomonas putida* | 20,000,000 | 0.1 |
| Total | 200,000,000 | 1.00 |

In some embodiments of the disclosed composition the relative abundance of an individual strain in a consortia may be between 0.05 and 0.95. In many embodiments, the relative abundance of one strain may be greater than about 0.01, 0.05, 0.1, 0.15, 0.20, 0.25, 0.30, 0.35, 0.40, 0.45, 0.50, 0.65, 0.70, 0.75, 0.80, 0.85, 0.90, 0.95, 96, 0.97, 0.98, or 0.99 and less than about 0.99, 0.98, 0.97, 0.96, 0.95, 0.90, 0.85, 0.80, 0.75, 0.70, 0.65, 0.60, 0.55, 0.50, 0.45, 0.40, 0.35, 0.30, 0.25, 0.20, 0.15, 0.10, 0.05, 0.04, 0.03, 0.02 or 0.01. Thus, for example, the ratio of bacterial species in a consortia may be, without limitation, 0.5:0.5, 0.1:0.9, etc. (for consortia with two strains/species), 0.33:0.33:0.33, 0.1:0.4:

0.5, 0.2:0.6:0.2, etc. (for consortia with three strain/species), 0.1:0.4:0.4:0.1, 0.4:0.3:0.2:0.1 etc (for consortia with four strains/species).

Example 3—Evaluation of Biostimulant Performance in Greenhouse Studies

Figures 12A, 12B, 12C:
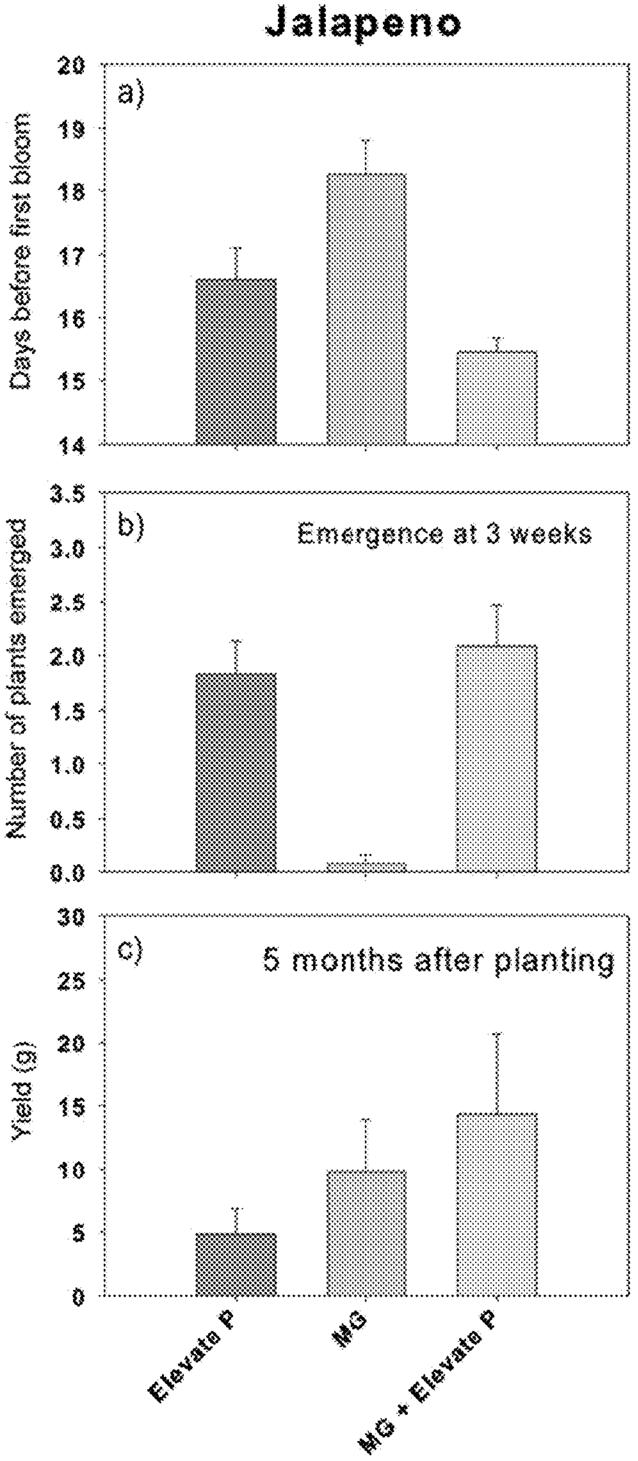
FIGS. 12A, 12B, and 12C are graphs showing FIG. 11A days before first bloom, FIG. 11B # of plants that emerged after 3 weeks, and 110 yield for jalapeño plants with Applicants' P mobilizing microbial biostimulant (Elevate P) and traditional inorganic fertilizers. The results show that Applicants' P mobilizing microbial biostimulant (Elevate P) demonstrated faster emergence and blooms compared to traditional inorganic fertilizers (MG=Miracle Gro).
Figures 13A, 13B:
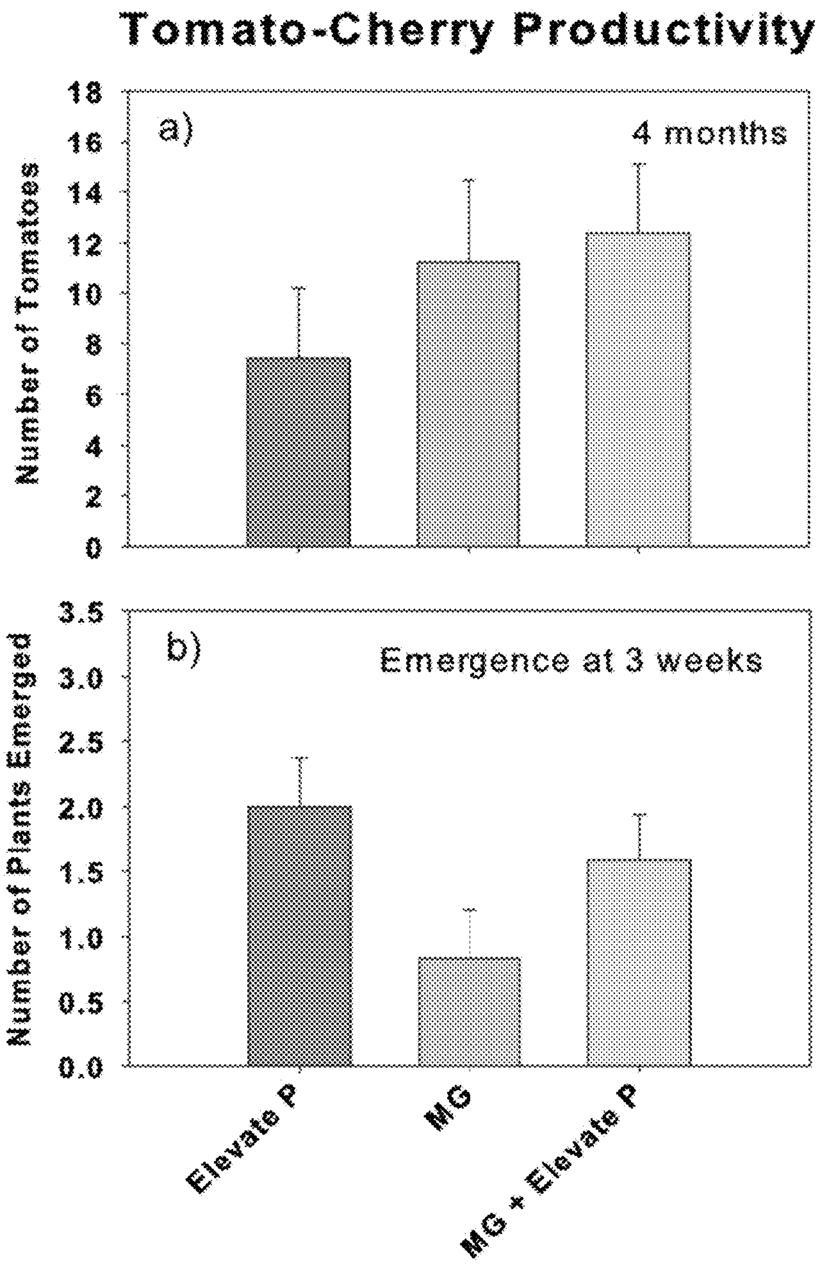
FIGS. 13A and 13B are graphs showing FIG. 13A # of tomatoes after 4 months and FIG. 13B # of plants that emerged after 3 weeks for cherry tomato plants with Applicants' P mobilizing microbial biostimulant (Elevate P) and traditional inorganic fertilizers. The results show that Applicants' P mobilizing microbial biostimulant (Elevate P) demonstrated faster emergence compared to traditional inorganic fertilizers (MG=Miracle Gro).
Figure 14A:
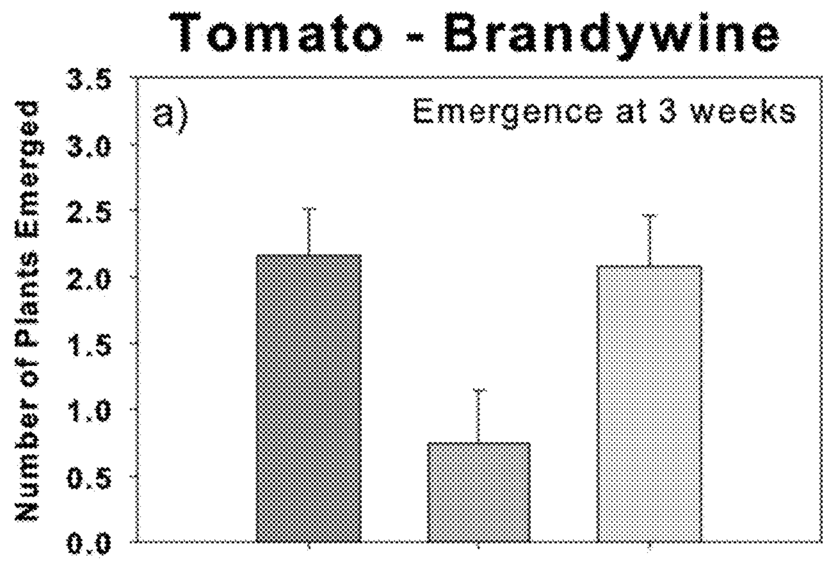
FIGS. 14A and 14B are graphs showing FIG. 14A # of plants that emerged after 3 weeks and FIG. 14B yield for Brandywine tomato plants with Applicants' P mobilizing microbial biostimulant (Elevate P) and traditional inorganic fertilizers. The results show that Applicants' P mobilizing microbial biostimulant (Elevate P) demonstrated faster emergence and more yield compared to traditional inorganic fertilizers (MG=Miracle Gro).
Figure 14B:
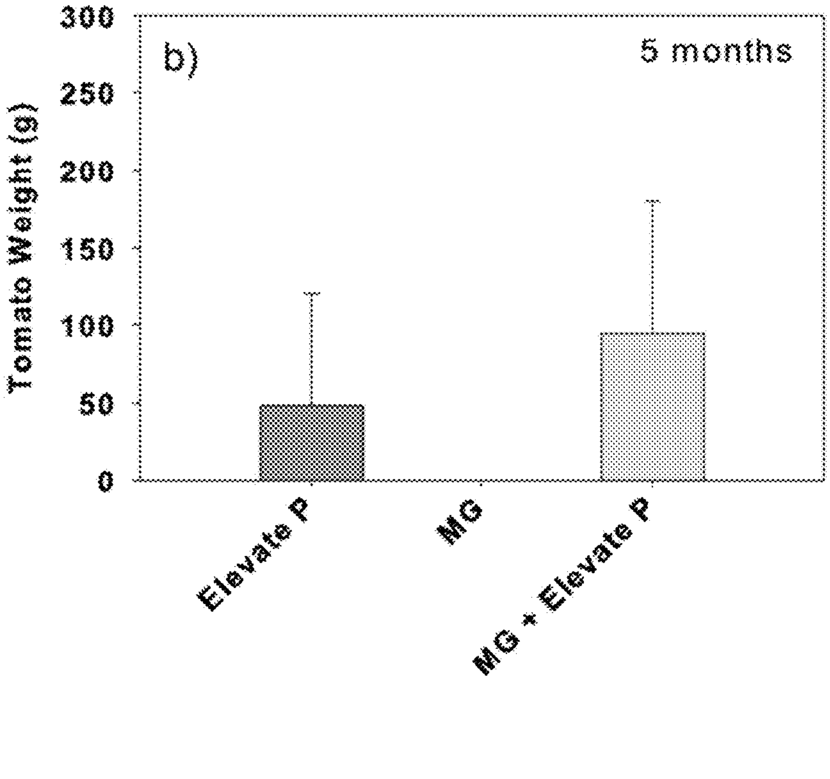
Figure 15:
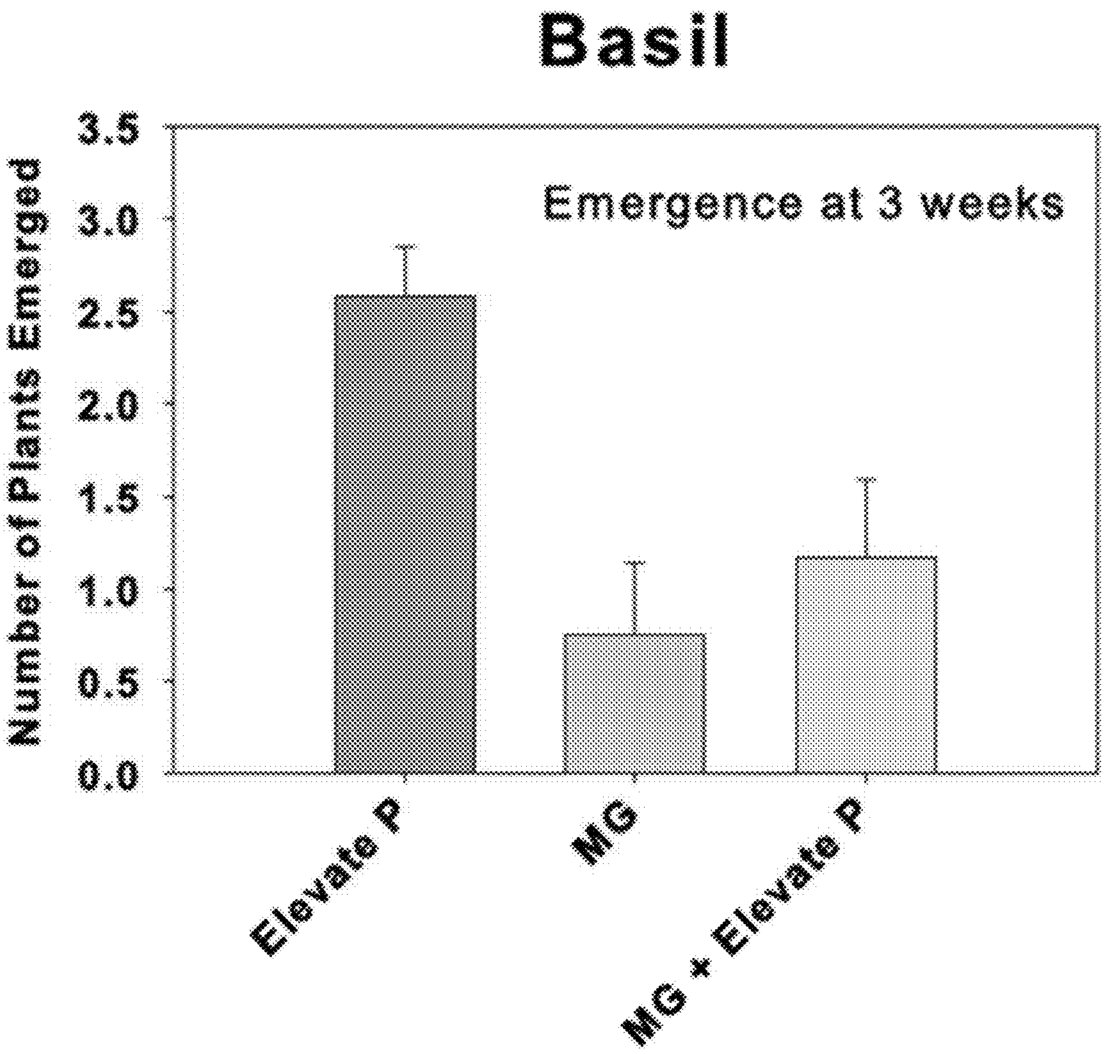
FIG. 15 is a graph showing number of plants that emerged after 3 weeks for Basil plants with Applicants' P mobilizing microbial biostimulant (Elevate P) and traditional inorganic fertilizers. The results show that Applicants' P mobilizing microbial biostimulant (Elevate P) demonstrated faster emergence compared to traditional inorganic fertilizers (MG=Miracle Gro).
Figure 16:
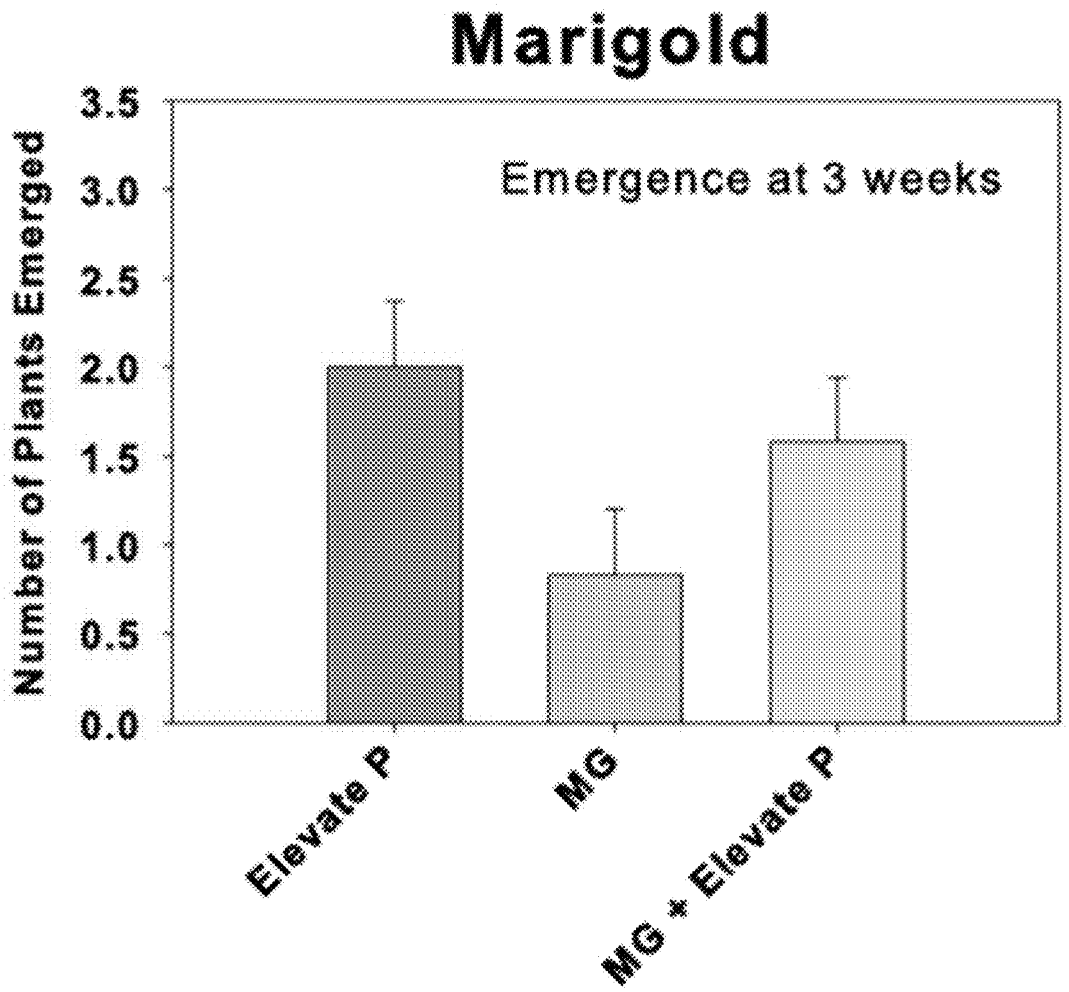
FIG. 16 is a graph showing# of plants that emerged after 3 weeks for Marigold plants with Applicants' P mobilizing microbial biostimulant (Elevate P) and traditional inorganic fertilizers. The results show that Applicants' P mobilizing microbial biostimulant (Elevate P) demonstrated faster emergence compared to traditional inorganic fertilizers (MG=Miracle Gro).

Applicants have tested the effectiveness and efficacy of the microbial P-mobilizing biostimulants to improve the early emergence, greenness, and general health of wheat (FIG. 64), turf grass (FIGS. 7-11), jalapeños (FIG. 12), tomatoes (FIGS. 13-15), basil (FIG. 15) and marigolds (FIG. 16) in greenhouse experiments. These experiments were conducted at the Plant Growth Facilities greenhouse on the Colorado State University campus (Fort Collins, Colo.), which provides a controlled 16-hour photoperiod to simulate sunlight for plant growth. Greenhouse daytime temperature is set to 23° C. and 17° C. at night.

For example, in an initial pilot study to assess the effectiveness of microbial biostimulants on turf grass health characteristics, we grew four different grass species in full sized seed trays (dimensions are 53.34 cm L×27.94 cm W×5.84 cm H), made from recycled polypropylene, with drainage holes in the bottom. The seed trays were filled ¾ full with collected soil. After adding soil to the seed trays, soils were pre-watered with 150 mL of water using a beaker. Recommended seed densities were then scattered across the top of the soil (1.6 g for Kentucky Bluegrass, and 2.66 g for Perennial Rye, Tall Fescue, and Bentgrass). The soils used in this experiment are characterized as Stoneham loam with a mixed alluvium and/or eolian deposit parent material (fine-loamy, mixed, mesic Haplustalfs) (NRCS, 2012). Aridic Haplustalfs are classified under the soil order Alfisols, typically undergo extended dry conditions and are widely used in agroecosystems and occupy approximately one-tenth of the Earth's land surface. These soils have clay-enriched subsoil and are characteristic of being deficient in available phosphorus in many parts of the world. In general, Alfisols have high aluminum (Al) and iron (Fe) content, suggesting these soils have a relatively high P sorption affinity. Once collected, soils were sieved using a 4 mm sieve to remove large objects (rocks, roots, etc.) and then with a 2 mm sieve to better homogenize aggregate size. The homogenized field soil were mixed with sterile sand mixture at a 1:1 ratio to maximize soil porosity while maintaining a reasonable amount of field soil for its nutrient and microbial properties. Before creating the soil-sand mixture, the sand (Quikrete; Atlanta, Ga.) was first sterilized in an autoclave for 30 minutes at 121° C. and 17 PSI, and was then saturated with sterile DI water (for ~30 min intervals) until a pH of ~8.0 is achieved to match the in situ field soil pH conditions (field soil pH mean±SE=8.3±0.05).

In reference to the Tables 4.1 and 4.2 (presented in FIGS. 17 and 18), different treatments were applied in this experiment including: Treatment 1) microbial consortia from our P mobilizing microbial consortia; Treatment 2) sterile media corresponding to treatment 1 (using 0.2 μM) with no microbial activity; and Treatment 3) a common nutrient rich inorganic plant fertilizer used for a control (Hoagland's solution), representing a non-limiting nutrient resource for grass growth. Each grass treatment (100 mL) was applied directly to the grass seed using a spray bottle. Once treatments were applied, a 1 cm layer of top soil was added to cover the seeds, followed by 400 mL of water which was applied to each seed box using a 500 mL beaker.

Figures 6A, 6B:
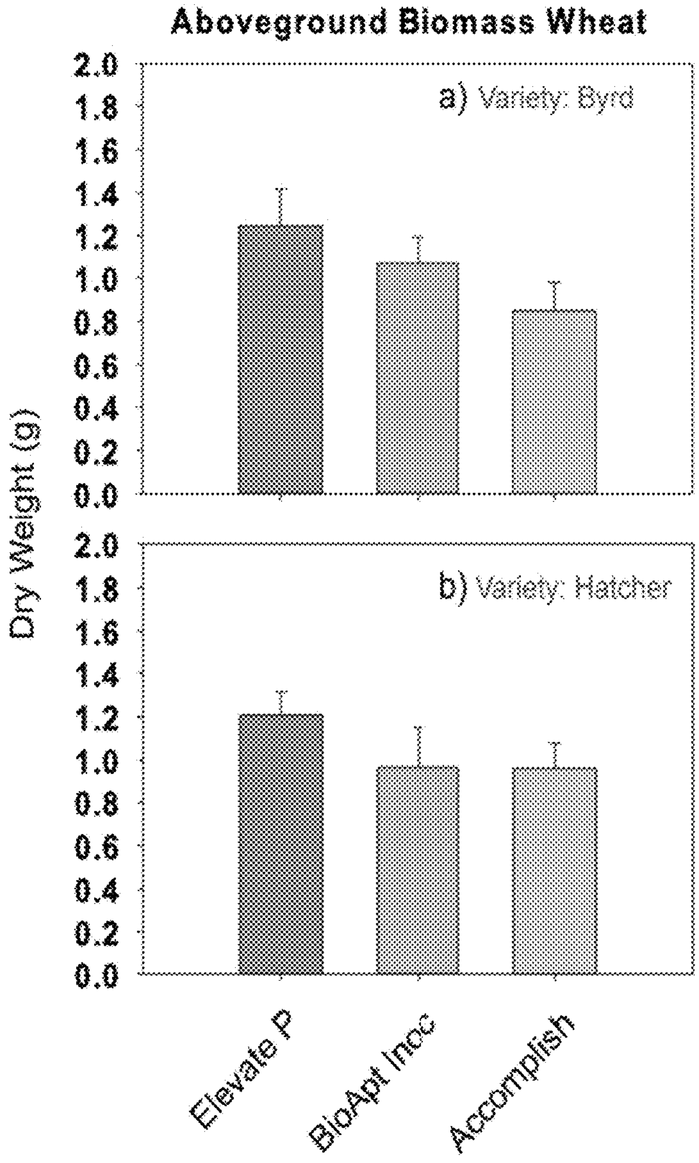
FIGS. 6A and 6B are graphs showing improved wheat biomass with use of one aspect of the present disclosure for two different wheat varieties FIG. 6A Byrd and FIG. 6B Hatcher. Wheat biomass was collected at the end of the growing season in a greenhouse trial. The results show that Applicants' P mobilizing microbial biostimulant (Elevate P; one embodiment of the disclosed composition) with traditional inorganic fertilizers demonstrated faster emergence and more growth compared to two competitor microbial biostimulant products with traditional inorganic fertilizers (BioApt Inoc and Accomplish).
Figures 7A, 7B, 7C:
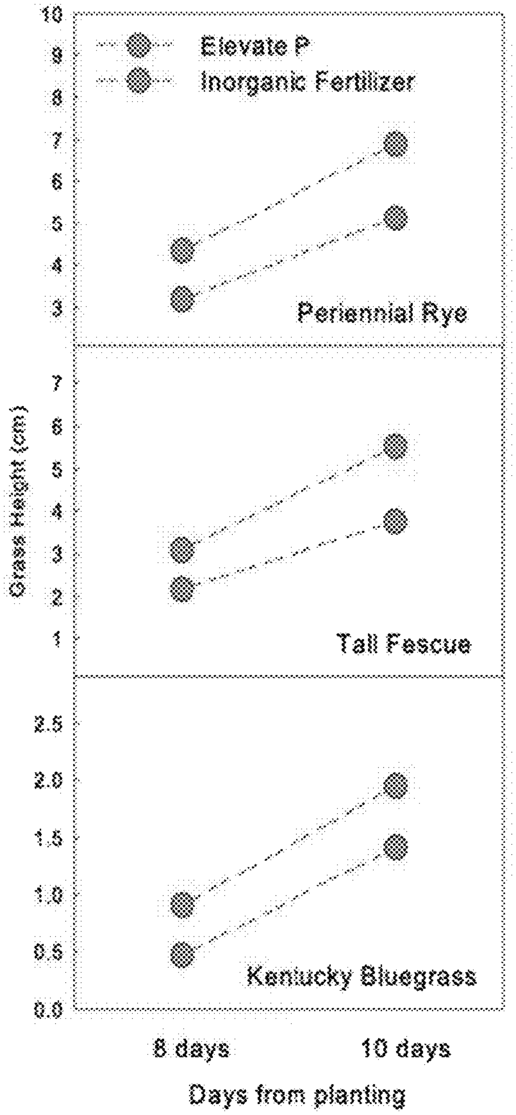
FIGS. 7A, 7B, and 7C are graphs showing grass height at 8 days and 10 days from planting with Applicants' P mobilizing microbial biostimulant (Elevate P) and traditional inorganic fertilizers. The results show that Applicants' P mobilizing microbial biostimulant (Elevate P) demonstrated faster emergence and more growth compared to traditional inorganic fertilizers (Inorganic Fertilizer), in Perennial Rye FIG. 7A, Tall Fescue FIG. 7B, and Kentucky Blue Grass FIG. 7C.
Figures 8A, 8B, 8C:
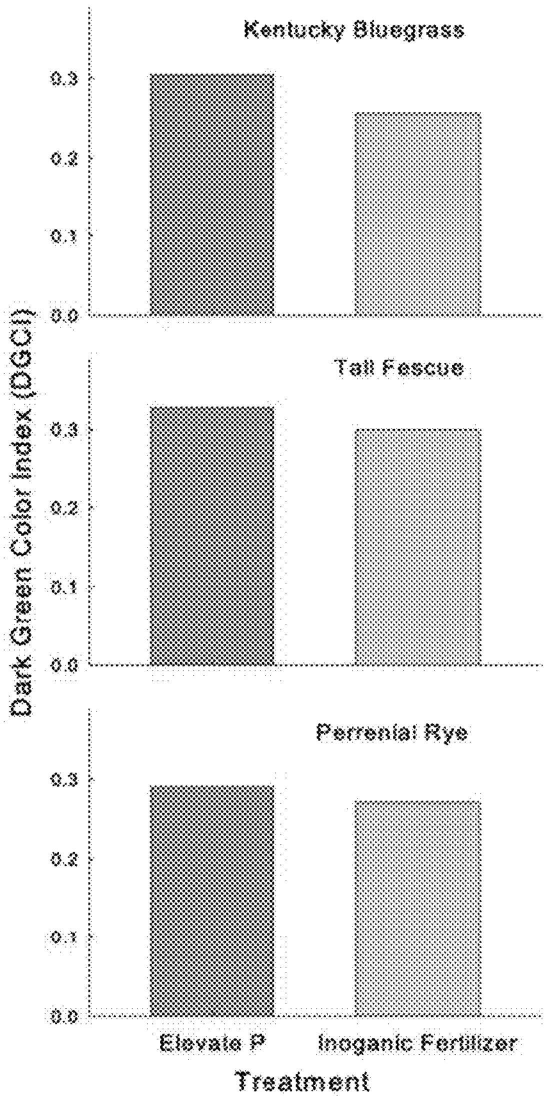
FIGS. 8A, 8B, and 8C are graphs of showing dark green color for Kentucky Blue Grass FIG. 8A, Tall Fescue FIG. 8B, and Perennial Rye FIG. 8C using applicants' P mobilizing microbial biostimulant (Elevate P) and traditional inorganic fertilizers. The results show that one embodiment of the P mobilizing microbial biostimulant of the present disclosure (Elevate P) demonstrated greener color relative to traditional inorganic fertilizers (Inorganic Fertilizer).
Figures 9A, 9B, 9C, 9D:
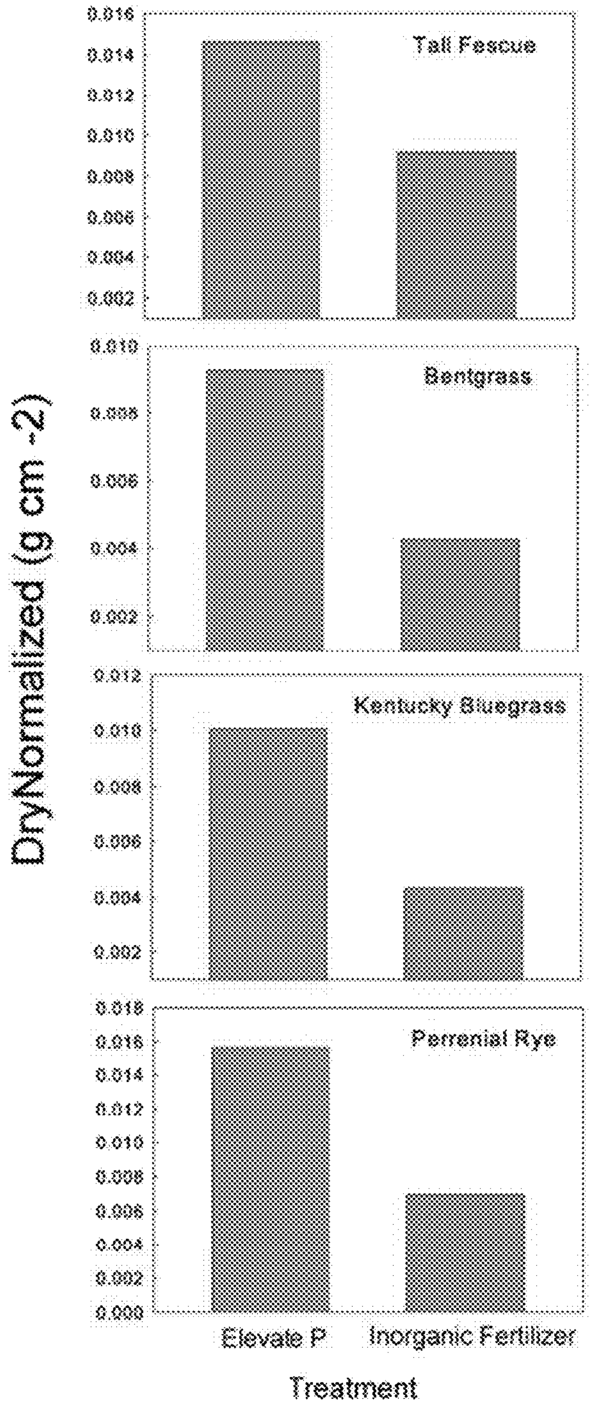
FIGS. 9A, 9B, 9C, and 9D are graphs showing plant growth reported as dry normalized $g/cm^2$ for Blue Grass FIG. 9B, Kentucky Blue Grass FIG. 9C, Tall Fescue FIG. 9A, and Perennial Rye FIG. 9D using applicants' P mobilizing microbial biostimulant (Elevate P) and traditional inorganic fertilizers. The results indicate that the P mobilizing microbial biostimulant of the disclosure (Elevate P) led to greater plant growth than traditional inorganic fertilizers (Inorganic Fertilizer).
Figure 10:
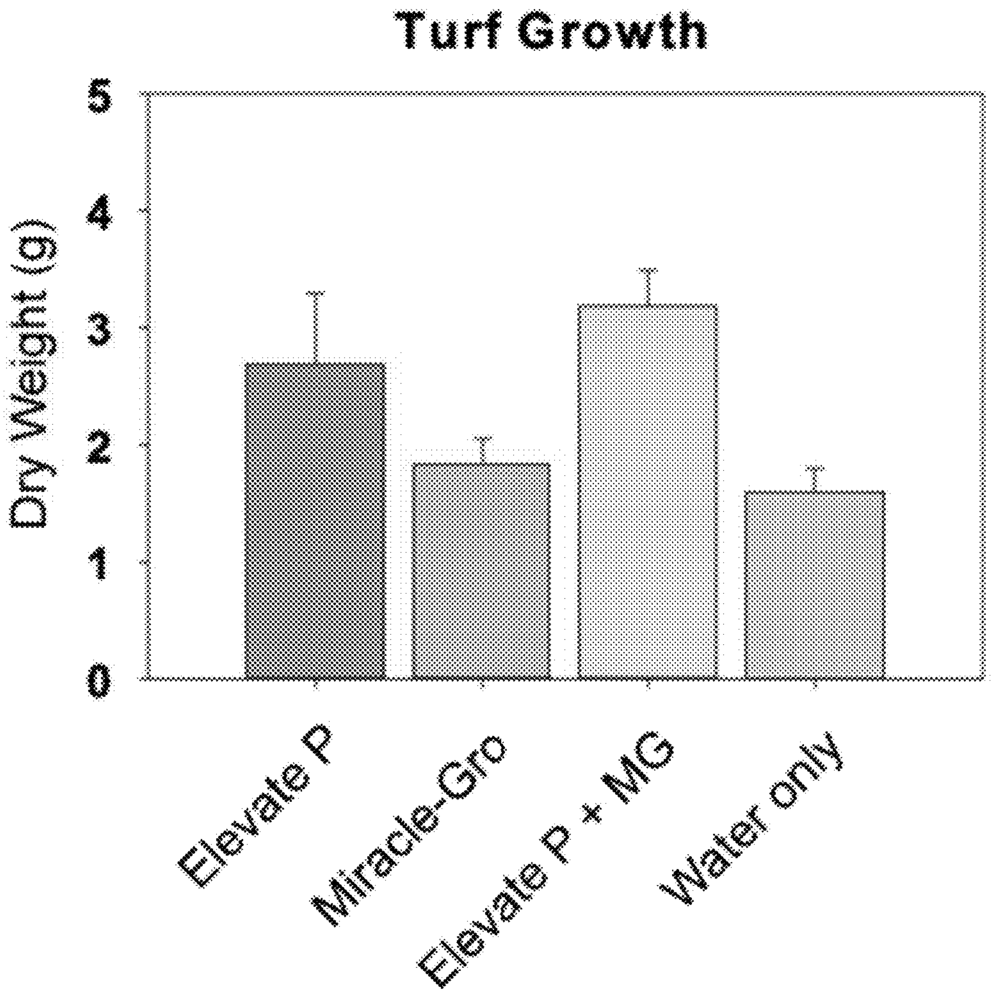
FIG. 10 is a graph showing plant growth reported as dry normalized g/cm2 for Kentucky Blue Grass using applicants' P mobilizing microbial biostimulant (Elevate P) and traditional inorganic fertilizers. The results indicate that the P mobilizing microbial biostimulant of the disclosure (Elevate P) led to greater plant growth than traditional inorganic fertilizers (MG=Miracle Gro).
Figure 11A:
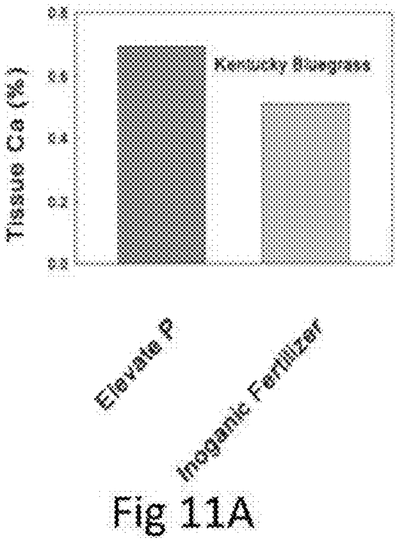
Figure 11B:
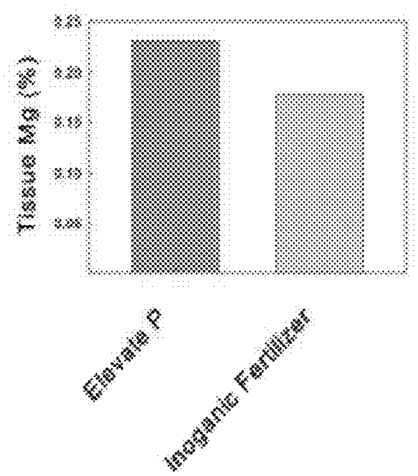
Figure 11C:
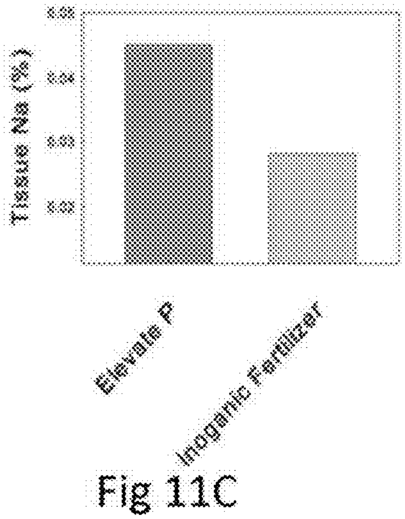
Figure 11D:
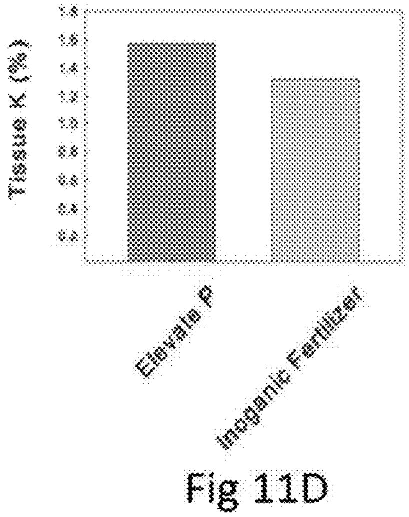
Figure 11E:
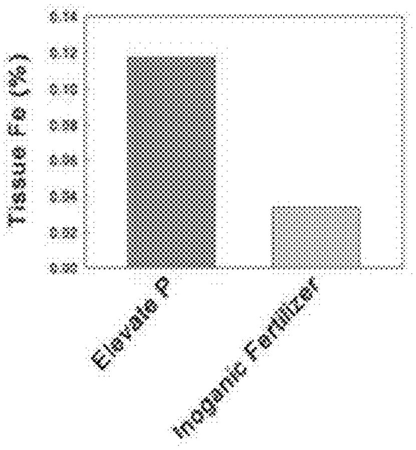

Faster emergence, higher grass growth and greener grass was observed in three of the four grass species (including Perennial Rye, Tall Fescue, and Kentucky Bluegrass) inoculated with Treatment 1 after 8 days from seeding compared to all other treatments (FIG. 6). The majority of grasses were greener (assesses using the DGCI index) (FIG. 7) and turf grasses incorporated more biomass when inoculated with our P mobilizing biostimulant compared to all other treatments including inorganic fertilizer additions, as demonstrated by Kentucky Bluegrass (FIG. 8-9). Furthermore, the increased soil nutrient availability and subsequent plant uptake for several macro and micro nutrients corresponded to microbial biostimulant applications (FIG. 11). For example, seeds inoculated with the P mobilizing microbial biostimulant composition of the present disclosure (Elevate P) demonstrated increased soil Calcium (Ca), Magnesium (Mg), Sodium (Na), Potassium (K), and Iron (Fe) uptake compared to traditional inorganic fertilizers (Inorganic Fertilizer) (FIG. 11). Applicants bacterial innoculants also increased the availability and uptake of several other nutrients, shown in Tables 4.1 and 4.2, FIGS. 17 and 18, respectively.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The present disclosure illustratively disclosed herein suitably may be practiced in the absence of any element that is not specifically disclosed herein and/or any optional element disclosed herein.

Example 4—Consortia Effect on Plant Growth

The effect that the presently claimed bacteria had on the growth of *Arabidopsis thaliana* was studied, because its growth is known to be affected by soil inoculations (Swenson et al., 2000). Two *Arabidopsis thaliana* wild type seeds (from Evotek Inc., Washington D.C., USA) were planted per pot in four inch pots filled with about one pint of autoclaved soil (50% agricultural topsoil and 50% potting soil). The seeded pots were maintained at 70° F. with 16 h per day of supplemental sunlight under a misting bench for about two weeks to ensure germination. Immediately after planting the seeds, 5 mL of media (alfalfa tea, described previously) was added to each pot.

Some of the media comprised one or more species of bacteria. If the media included bacteria, the total concentration of bacteria in the media was $6.5\pm2.1\times10^8$ cfu/ml. One set of plants received media alone ("media" or "0 ssp"). One set of plants received media containing all four species of bacteria ("4 ssp"): *Comamonas testosieroni* (Ce), *Citrobacter freundii* (Cf), *Enterobacter cloacae* (Ec), and *Pseudomonas putida* (Pp). Four sets of plants received media containing one species ("1 ssp"), each, of Ce, Cf, Ec, or Pp, Six sets of plants received media containing equivalent amounts of two bacterial species ("2 ssp"), each, selected from Ce, Cf, Ec, and Pp: Ce+CF, Ce+Ec, Ce+Pp, Cf+Ee, Cf+Pp, and Ec+Pp. Four sets of plants received media containing equivalent amounts of three bacterial species ("3 ssp"), each, selected from Cc, Cf, Ec, and Pp; Ce+Cf+Ec, Ce+Ec+Pp, Ce+Cf+Pp, and Cf+Ec+Pp.

If both seeds germinated, the smaller of the two was removed from the pot. After germination the pots were inoculated a second time, again with 5 mL of media containing the appropriate bacterial mix, or no bacteria (0 ssp). The pots were kept moist by daily watering in a mist bench for two weeks to ensure germination. Two weeks after seeding, the plants were removed from the mist bench, but daily watering was maintained.

Three variables were measured to assess growth of each plant: the number of rosette leaves, the maximum rosette diameter, and plant height. Measurements were taken and recorded twice weekly. Plants that were unable to bolt-in (growing up) after 32 days were excluded from the analysis. The inability to bolt-in was equally distributed among all the treatments.

Figure 19:
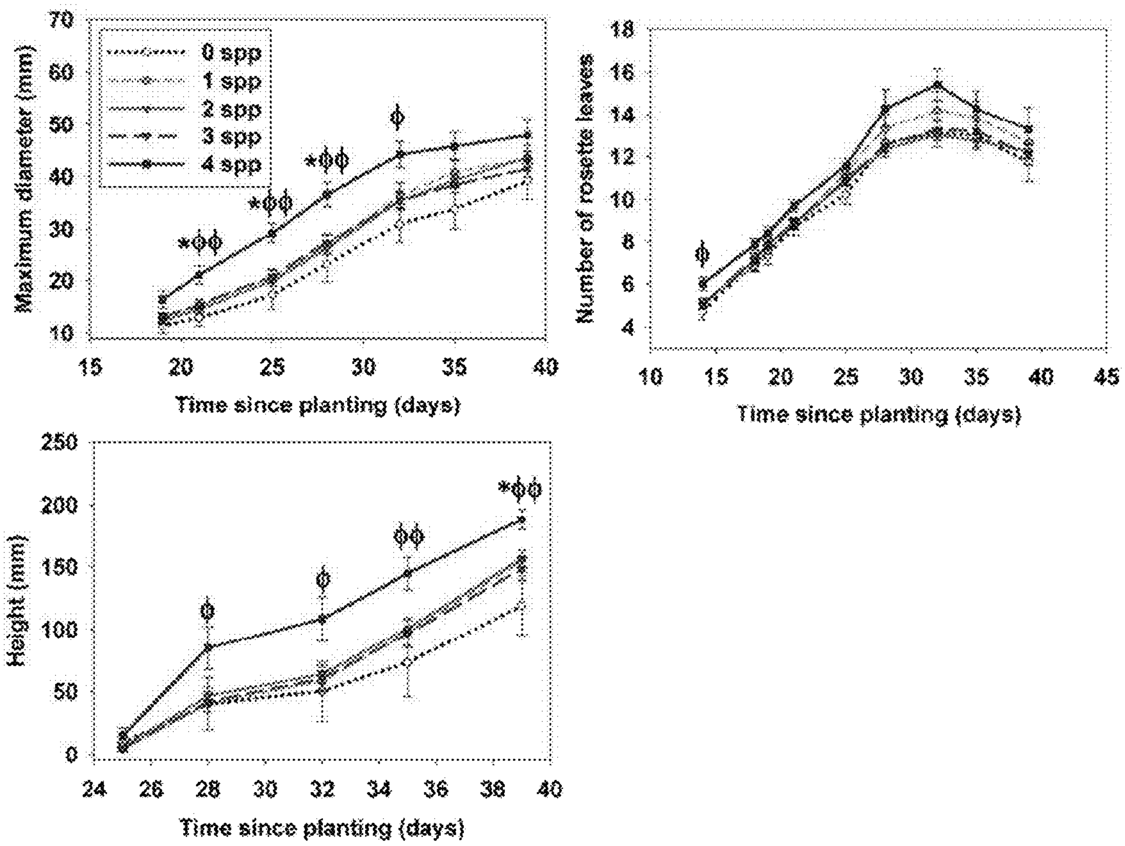
FIG. 19 shows graphs of various indicators of plant growth over time; rosette number, rosette diameter, and plant height for seeds grown with or without various combinations of the disclosed bacteria.

FIG. 19 shows results from these experiments, specifically *Arabidopsis* growth indicators for seeds inoculated with media comprising different numbers of species. Tables 5-9 present data used to create the graphs in FIG. 19. The points graphed in FIG. 19 represent the mean and the error bars indicate the standard error of the mean of 6-8 replicates. The symbols indicate data from 4 species treatments, 4 ssp, are significantly greater than 0 species at $p<0.05$ (φφ) or $p<0.1$ (φ) and 4 species being greater than all other treatments at $p<0.05$ (**) or $p<0.1$ (*). Surprisingly, and for each variable measured, plant growth showed greatest enhancement where the media included all four species, 4 ssp. This result was consistent throughout the development of the plant; early phase (number of rosette leaves), early-intermediate phase (maximum rosette diameter), and intermediate-late phase (plant height).

Specifically, the growth rate the first five days after the first plant started bolting (growing a stem) the full four species treatment resulted in a height growth rate over five times greater than simply adding media without microbes. Interestingly, adding between 1 and 3 species did not result in any significant effect over just adding media. Finally, the presence of four bacterial species in the media helped to reduce variability of the data by 2-fold (relative to ssp 1, ssp 2, and ssp 3) and 3-fold (relative to 0 ssp, media control).

Table 5 shows *Arabidopsis* productivity by number of species in the treatment. Letters behind the values in the table indicate the relationship between values in a given column, specifically significant differences ($p<0.1$; e.g. "a" is similar to "a" and "ab" but not "b"). All treatments received indicated fertilizer applications. Treatment ssp 4 (Mammoth P) increased productivity by 25%, 71% and 58% for the three productivity metrics assessed. The number of rosette leaves were assessed after 14 days; the maximum rosette diameter after 25 days; plant height was assessed 39 days after planting.

TABLE 5

| Treatment | Number of rosette leaves ± SE | Max Rosette diameter (mm) ± SE | Plant Height (mm) ± SE |
|---|---|---|---|
| 0 ssp-Control | 4.8 ± 0.4 b | 17 ± 3 b | 119 ± 23 b |
| 1 ssp | 5.1 ± 0.2 ab | 21 ± 2 b | 155 ± 9 a |
| 2 ssp | 5.1 ± 0.1 b | 20 ± 1 b | 160 ± 7 a |
| 3 ssp | 5.1 ± 0.2 ab | 21 ± 1 b | 154 ± 9 a |
| 4 ssp-Mammoth P | 6.0 ± 0.3 a | 29 ± 2 a | 188 ± 8 a |

Table 6 shows *Arabidopsis* productivity by specific treatments for metric specific peak time points. The number of rosette leaves were assessed after 14 days; the maximum rosette diameter after 25 days; plant height was assessed 39 days after planting.

TABLE 6

| Treatment | Number of rosette leaves ± SE | Max Rosette diameter (mm) ± SE | Plant Height (mm) ± SE |
|---|---|---|---|
| ssp 4 (Mammoth P; Cf, Ec, Pp & Ce | 6.0 ± 0.3 | 29 ± 2 | 188 ± 8 |
| Cf, Ec & Pp | 5.3 ± 0.3 | 23 ± 1 | 172 ± 15 |
| Cf & Pp | 4.8 ± 0.5 | 21 ± 4 | 165 ± 18 |
| E & Pp | 5.0 ± 0.3 | 21 ± 3 | 150 ± 19 |
| Pp & Ce | 4.8 ± 0.3 | 20 ± 2 | 156 ± 13 |
| Cf & Ec | 5.5 ± 0.3 | 21 ± 3 | 166 ± 20 |
| C & Ce | 5.0 ± 0.3 | 19 ± 2 | 145 ± 16 |
| E & Ce | 5.4 ± 0.2 | 21 ± 2 | 184 ± 14 |
| Pp | 5.0 ± 0.4 | 19 ± 3 | 142 ± 25 |
| Cf | 5.0 ± 0.4 | 18 ± 2 | 167 ± 25 |
| Ec | 5.4 ± 0.2 | 20 ± 1 | 168 ± 11 |
| Ce | 5.1 ± 0.4 | 24 ± 4 | 146 ± 12 |
| 0 ssp-Control | 4.8 ± 0.4 | 17 ± 3 | 119 ± 23 |

Table 7 shows *Arabidopsis* growth by height (mm) for all treatments and sampling times. The numbers indicate the mean±SE. Mammoth P has all four species; Cf=*E. Citrobacter*, Ec=*E. Enterobacter*, Pp=*P. Pseudomonas*; Ce=*C. Comamonas*

TABLE 7

| Treatment | Day 28 | Day 32 | Day 33 | Day 35 | Day 39 | Day 42 | Day 46 |
|---|---|---|---|---|---|---|---|
| Ce, Cf, Ec&Pp | 16 ± 6 | 85 ± 17 | 109 ± 18 | 145 ± 13 | 188 ± 8 | 211 ± 12 | 237 ± 17 |
| Cf, Ec&Pp | 5 ± 2 | 50 ± 17 | 71 ± 19 | 117 ± 20 | 172 ± 15 | 205 ± 12 | 252 ± 12 |
| Cf&Pp | 3 ± 2 | 41 ± 16 | 59 ± 20 | 164 ± 25 | 165 ± 18 | 208 ± 11 | 248 ± 20 |
| Ec&Pp | 8 ± 6 | 44 ± 21 | 61 ± 23 | 96 ± 26 | 150 ± 19 | 189 ± 12 | 237 ± 7 |
| Pp&Ce | 4 ± 2 | 37 ± 15 | 54 ± 17 | 92 ± 18 | 156 ± 13 | 204 ± 11 | 246 ± 13 |
| Cf&Ec | 9 ± 3 | 67 ± 18 | 88 ± 21 | 123 ± 23 | 166 ± 20 | 193 ± 19 | 224 ± 15 |
| Cf&Ce | 8 ± 4 | 44 ± 14 | 60 ± 16 | 95 ± 18 | 145 ± 16 | 176 ± 13 | 220 ± 9 |
| Ec&Ce | 11 ± 4 | 66 ± 18 | 84 ± 19 | 126 ± 20 | 184 ± 14 | 222 ± 12 | 252 ± 9 |
| Pp | 4 ± 2 | 44 ± 14 | 57 ± 17 | 94 ± 24 | 142 ± 25 | 179 ± 23 | 219 ± 20 |
| Cf | 10 ± 7 | 66 ± 17 | 60 ± 29 | 96 ± 33 | 167 ± 25 | 211 ± 17 | 259 ± 11 |
| Ec | 4 ± 1 | 40 ± 13 | 67 ± 11 | 114 ± 13 | 168 ± 11 | 208 ± 11 | 251 ± 8 |
| Ce | 3 ± 2 | 51 ± 27 | 50 ± 14 | 88 ± 17 | 146 ± 12 | 187 ± 12 | 240 ± 16 |
| Control | 10 ± 6 | 46 ± 10 | 51 ± 24 | 74 ± 27 | 119 ± 23 | 158 ± 16 | 209 ± 11 |

Table 8 shows *Arabidopsis* growth by maximum diameter (mm) for all treatments and sampling times. The numbers indicate the mean±SE. Mammoth P has all four species; Cf=*E. Citrobacter*, Ec=*E. Enterobacter*, Pp=*P. Pseudomonas*; Ce=*C. Comamonas*.

TABLE 8

| Treatment | Day 19 | Day 21 | Day 25 | Day 28 | Day 32 | Day 35 | Day 39 | Day 46 |
|---|---|---|---|---|---|---|---|---|
| Ce, Cf, Ec&Pp (ssp 4; MammothP) | 16 ± 2 | 21 ± 2 | 29 ± 2 | 37 ± 2 | 44 ± 3 | 46 ± 3 | 48 ± 3 | 46 ± 5 |
| Cf, Ec&Pp | 14 ± 1 | 16 ± 1 | 23 ± 1 | 28 ± 3 | 38 ± 4 | 40 ± 4 | 42 ± 4 | 45 ± 5 |
| Cf&Pp | 13 ± 3 | 15 ± 3 | 21 ± 4 | 27 ± 4 | 35 ± 4 | 41 ± 4 | 46 ± 5 | 49 ± 5 |
| Ec&Pp | 12 ± 2 | 15 ± 3 | 21 ± 3 | 27 ± 3 | 37 ± 2 | 42 ± 2 | 45 ± 2 | 46 ± 3 |
| P&Ce | 12 ± 1 | 15 ± 2 | 20 ± 2 | 26 ± 2 | 36 ± 4 | 42 ± 3 | 47 ± 3 | 50 ± 4 |
| Cf&Ec | 14 ± 2 | 16 ± 2 | 21 ± 3 | 28 ± 4 | 37 ± 5 | 37 ± 5 | 41 ± 5 | 40 ± 5 |
| Cf&Ce | 12 ± 1 | 14 ± 1 | 19 ± 2 | 25 ± 2 | 33 ± 2 | 35 ± 2 | 39 ± 2 | 40 ± 1 |
| Ec&Ce | 13 ± 1 | 15 ± 1 | 21 ± 2 | 28 ± 2 | 38 ± 4 | 41 ± 3 | 44 ± 3 | 45 ± 3 |
| Pp | 12 ± 2 | 15 ± 3 | 19 ± 3 | 24 ± 4 | 31 ± 5 | 34 ± 5 | 37 ± 5 | 37 ± 5 |
| Cf | 11 ± 2 | 13 ± 2 | 18 ± 2 | 25 ± 2 | 36 ± 5 | 43 ± 5 | 46 ± 5 | 49 ± 6 |
| Ec | 13 ± 1 | 14 ± 1 | 20 ± 1 | 26 ± 2 | 35 ± 2 | 39 ± 2 | 42 ± 2 | 44 ± 3 |
| Ce | 15 ± 2 | 18 ± 3 | 24 ± 4 | 31 ± 5 | 43 ± 6 | 47 ± 6 | 48 ± 6 | 52 ± 8 |
| Control | 11 ± 1 | 13 ± 2 | 17 ± 3 | 23 ± 3 | 31 ± 4 | 34 ± 4 | 39 ± 3 | 43 ± 4 |

TABLE 9

| Treatment | Day 14 | Day 18 | Day 19 | Day 21 | Day 25 |
|---|---|---|---|---|---|
| Ce, Cf, Ec & Pp-Mammoth P | 6.0 ± 0.3 | 7.9 ± 0.3 | 8.4 ± 0.3 | 9.7 ± 0.3 | 11.6 ± 0.4 |
| Cf, Ec & Pp | 5.3 ± 0.3 | 7.8 ± 0.7 | 8.3 ± 0.6 | 9.0 ± 0.4 | 11.3 ± 0.2 |
| Cf & Pp | 4.8 ± 0.5 | 7.5 ± 0.5 | 8.0 ± 0.5 | 9.2 ± 0.7 | 11.2 ± 0.7 |
| Ec & Pp | 5.0 ± 0.3 | 6.7 ± 0.3 | 7.6 ± 0.4 | 8.9 ± 0.4 | 10.4 ± 0.5 |
| Pp & Ce | 4.8 ± 0.3 | 6.6 ± 0.3 | 7.6 ± 0.3 | 8.8 ± 0.4 | 10.9 ± 0.4 |
| Cf & Ec | 5.5 ± 0.3 | 7.5 ± 0.3 | 8.5 ± 0.3 | 9.3 ± 0.5 | 11.5 ± 0.6 |
| Cf & Ce | 5.0 ± 0.3 | 7.0 ± 0.3 | 7.8 ± 0.3 | 8.8 ± 0.3 | 10.3 ± 0.3 |
| E & Ce | 5.4 ± 0.2 | 7.7 ± 0.2 | 8.3 ± 0.2 | 9.6 ± 0.2 | 11.4 ± 0.2 |
| Pp | 5.0 ± 0.4 | 6.4 ± 0.6 | 7.3 ± 0.6 | 8.4 ± 0.5 | 11.6 ± 1.2 |
| Cf | 5.0 ± 0.4 | 6.4 ± 0.4 | 7.6 ± 0.4 | 8.8 ± 0.5 | 10.4 ± 0.5 |
| Ec | 5.4 ± 0.2 | 7.1 ± 0.1 | 7.7 ± 0.2 | 9.0 ± 0.0 | 11.6 ± 0.2 |
| Ce | 5.1 ± 0.4 | 7.1 ± 0.4 | 7.8 ± 0.4 | 9.0 ± 0.5 | 11.4 ± 0.7 |
| Control | 4.8 ± 0.4 | 7.0 ± 0.4 | 7.4 ± 0.5 | 8.8 ± 0.4 | 10.3 ± 0.5 |

| Treatment | Day 28 | Day 32 | Day 35 | Day 39 | Day 46 |
|---|---|---|---|---|---|
| Ce, Cf, Ec & Pp-Mammoth P | 14.3 ± 0.9 | 15.4 ± 0.8 | 14.3 ± 0.8 | 13.3 ± 1.1 | 12.6 ± 1.3 |
| Cf, Ec & Pp | 13.0 ± 0.3 | 14.2 ± 0.8 | 14.0 ± 1.3 | 13.0 ± 1.2 | 13.1 ± 1.4 |
| Cf & Pp | 12.8 ± 0.6 | 13.3 ± 0.7 | 12.8 ± 0.5 | 12.2 ± 0.9 | 12.3 ± 1.1 |
| Ec & Pp | 12.7 ± 0.6 | 13.3 ± 0.5 | 12.4 ± 0.2 | 11.3 ± 0.3 | 12.7 ± 1.0 |
| Pp & Ce | 12.4 ± 0.3 | 13.0 ± 0.6 | 13.3 ± 0.7 | 12.8 ± 0.7 | 13.5 ± 0.9 |
| Cf & Ec | 12.7 ± 0.9 | 14.0 ± 1.1 | 12.8 ± 1.2 | 12.2 ± 1.5 | 11.8 ± 1.4 |
| Cf & Ce | 11.8 ± 0.3 | 12.4 ± 0.5 | 12.4 ± 0.7 | 11.9 ± 0.7 | 12.1 ± 0.8 |
| Ec & Ce | 12.4 ± 0.5 | 13.0 ± 0.5 | 13.4 ± 0.8 | 14.0 ± 0.9 | 13.3 ± 0.8 |
| Pp | 14.3 ± 2.5 | 15.9 ± 3.1 | 15.3 ± 2.8 | 14.1 ± 2.4 | 12.4 ± 2.0 |
| Cf | 12.8 ± 0.6 | 13.4 ± 0.7 | 12.6 ± 0.6 | 12.0 ± 0.9 | 13.0 ± 1.1 |
| Ec | 12.7 ± 0.2 | 13.4 ± 0.7 | 13.0 ± 0.7 | 11.7 ± 1.0 | 13.4 ± 1.1 |
| Ce | 13.4 ± 0.9 | 14.0 ± 1.0 | 14.1 ± 1.1 | 12.6 ± 1.1 | 12.0 ± 1.0 |
| 0 ssp-Control | 12.6 ± 0.7 | 13.1 ± 0.7 | 13.0 ± 0.7 | 11.8 ± 0.9 | 12.0 ± 0.7 |

Table 9 shows *Arabidopsis* growth by number of rosette leaves for all treatments and sampling times. The numbers indicate the mean±SE. Mammoth P has all four species; Cf=*E. Citrobacter*, Ec=*E. Enterobacter* Pp=*P. Pseudomonas*; Ce=*C. Comamonas.*

DEPOSITS

A deposit of consortia of Applicant's Phosphorus Mobilizing Consortia and Applicant's Mineralizing Consortia, is and has been maintained by Colorado State University since prior to the filing date of this application. Access to this deposit will be available during the pendency of the application to the Commissioner of Patents and Trademarks and persons determined by the Commissioner to be entitled thereto upon request. Upon allowance of any claims in the application, the Applicant(s) will make available to the public without restriction a deposit of the consortia bacterial with the ARS Culture Collection of the U.S. Department of Agriculture's National Center For Agricultural Utilization Research (NRRL; the "Depository"), Peoria, Ill., 61604. The bacteria deposited with the Depository will be taken from the same deposit maintained at Colorado State University as described above. Additionally, Applicant will meet all the requirements of 37 C.F.R. §1.801-1.809, including providing an indication of the viability of the sample when the deposit is made. The accession numbers for one embodiment of the consortia bacteria are: *Comamonas testosteroni*, NRRL B-67136; *Citrobacter freundii*, NRRL B-67137; *Enterobacter cloacae*, NRRL B-67138; *Pseudomonas putida*, B-67139.

This deposit of the aforementioned bacteria will be maintained in the Depository, which is a public depository, for a period of 30 years, or 5 years after the most recent request, or for the enforceable life of the patent, whichever is longer, and will be replaced if it ever becomes nonviable during that period. Applicant will impose no restrictions on the availability of the deposited material; however, Applicant has no authority to waive any restrictions imposed by law on the transfer of biological material or its transportation in commerce.

What is claimed:

1. A composition for enhancing the rate at which organic soil phosphorus is converted to orthophosphate comprising two or more bacterial strains selected from bacterial strains with NRRL Accession numbers NRRL B-67136, NRRL B-67137, NRRL B-67138, and NRRL B-67139, and a carrier.

2. The composition of claim 1, wherein the composition includes three or more bacterial strains.

3. The composition of claim 1, wherein the composition comprises all four bacterial strains.

4. The composition of claim 1, wherein the two bacterial strains have NRRL Accession numbers NRRL B-67136 and NRRL B-67139.

5. The composition of claim 1, wherein the carrier comprises one or more compounds extracted from alfalfa.

6. The composition of claim 1 wherein said composition is a liquid composition.

7. The composition of claim 6 wherein said liquid composition is concentrated to remove water.

8. The composition of claim 7 wherein said liquid composition has a total number of microorganisms of about 100,000 to about 100,000,000 colony forming units per milliliter.

9. A method for enhancing the rate at which organic soil phosphorus is converted to orthophosphate comprising contacting a soil with the composition of claim 1.

10. The method of claim 9 wherein said composition comprises three or more bacterial strains.

11. The method of claim 9, wherein the soil comprises a seed or plant.

12. The method of claim 9 wherein the composition comprises all four bacterial strains.

13. The method of claim 11 further comprising the step of allowing the seed or plant within the soil to grow.

14. The method of claim 11 wherein the seed or plant is added to the soil after contacting the soil with the composition.

15. The method of claim 9, wherein the soil is contacted by spraying the soil with the composition.

16. The method of claim 9 wherein the composition is in the form of a powder or granulated composition.

17. The method of claim 9 wherein the composition is liquid.

18. A method of increasing the growth rate of a plant comprising:

contacting a soil comprising a plant with the composition of claim 1;

allowing the composition's bacterial strains to solubilize one or more phosphorous compounds; and allowing the plant to take up the solubilized phosphorous, thereby increasing the growth rate of the plant.

19. The method of claim 18, wherein the composition comprises three or more bacterial strains.

20. The method of claim 18, wherein the height, weight, color, or yield of the plant is measured to determine growth.

21. The method of claim 18, wherein the growth of the plant is at least 2% greater than the same plant grown in soil that has not been contacted by the composition.

* * * * *